United States Patent
Meguro et al.

(10) Patent No.: US 6,686,073 B2
(45) Date of Patent: Feb. 3, 2004

(54) MAGNETIC RECORDING MEDIUM CONTAINING SPECIFIC BINDER IN THE MAGNETIC LAYER AND THE LOWER NON-MAGNETIC LAYER

(75) Inventors: Katsuhiko Meguro, Kanagawa (JP); Hiroshi Hashimoto, Kanagawa (JP); Yuichiro Murayama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 70 days.

(21) Appl. No.: 09/988,453

(22) Filed: Nov. 16, 2001

(65) Prior Publication Data

US 2002/0090535 A1 Jul. 11, 2002

(30) Foreign Application Priority Data

Nov. 16, 2000 (JP) .................................... P.2000-349680
Mar. 2, 2001 (JP) .................................... P.2001-058349

(51) Int. Cl.$^7$ ........................... B32B 5/16; G11B 5/714; G11B 5/738
(52) U.S. Cl. ........................ 428/694 BU; 428/694 BG; 428/694 BY; 428/694 BL; 428/694 BN; 428/694 BA; 428/694 BH
(58) Field of Search .................... 428/694 BC, 694 BG, 428/694 BU, 694 BY, 694 BL, 694 BN, 694 BA, 694 BH

(56) References Cited

U.S. PATENT DOCUMENTS 4,434,210 A * 2/1984 Nakajama et al.
4,443,514 A * 4/1984 Yamamoto et al.
5,766,812 A * 6/1998 Malhotra
5,932,392 A * 8/1999 Hirai et al.
6,030,699 A * 2/2000 Wang et al.

FOREIGN PATENT DOCUMENTS

| EP | 0 926 661 A2 | 6/1999 |
| EP | 0 962 919 A1 | 12/1999 |
| EP | 1 022 726 A1 | 7/2000 |
| JP | 6-111279 | 4/1994 |
| JP | 06-111279 | 4/1994 |

* cited by examiner

Primary Examiner—H. Thi Le
(74) Attorney, Agent, or Firm—Stroock & Stroock & Lavan LLP

(57) ABSTRACT

A magnetic recording medium containing a support having provided thereon a lower layer containing a nonmagnetic powder and a binder and further provided thereon at least one magnetic layer containing a ferromagnetic powder and a binder. The lower layer can contain as a binder at least a monomer unit containing from 5 to 45% by weight of a (meth)acrylate unit containing a benzene ring and from 1 to 45% by weight of a radical polymerizable monomer unit containing a nitrogen atom, with these units making a total amount of 100% by weight. It can also contain an acrylic resin having a hydrophilic polar group. The magnetic recording medium may also contain a support having provided thereon at least one magnetic layer containing a ferromagnetic powder and a binder each in the dispersed state. The magnetic layer can contain at least a monomer unit comprising from 15 to 75% by weight of an alkyl (meth) acrylate as a binder and from 1 to 45% by weight of a radical polymerizable monomer unit containing nitrogen, with these units making a total amount of 100% by weight. It can also contain an acrylic resin having a hydrophilic polar group used in combination with a resin (A) defined herein; a resin (B) defined herein; or a resin (C) defined herein.

14 Claims, No Drawings

MAGNETIC RECORDING MEDIUM CONTAINING SPECIFIC BINDER IN THE MAGNETIC LAYER AND THE LOWER NON-MAGNETIC LAYER

FIELD OF THE INVENTION

The present invention relates to a magnetic recording medium having very excellent electromagnetic conversion characteristics (i.e., electromagnetic characteristics) and running durability.

BACKGROUND OF THE INVENTION

The magnetic recording medium commonly used is a recording medium obtained by providing on a nonmagnetic support a magnetic layer comprising a binder having dispersed therein ferromagnetic powder particles. Recently, in the field of magnetic recording, digital recording is practically taking the place of conventional analog recording because of its less deterioration of recording. In the digital recording, a large number of signals must be generally recorded and moreover, the recording/reproducing apparatus and the recording medium used therefor are demanded to ensure high image quality and high sound quality and at the same time, realize downsizing and space saving. To cope with these requirements, still higher density recording is being demanded.

For achieving higher density recording, recording signal with a short wavelength and recording locus in a narrow track are employed. As for the recording medium, more improvement in the electromagnetic conversion characteristics is demanded and for this purpose, various proposals have been proposed, such as improvement in the magnetic characteristics of ferromagnetic powder, formation of fine particles, high filling, or ultra-smoothing of the medium surface. These are, however, not satisfactory for the higher density recording demanded in recent years.

For reducing noises, the matter of importance is to reduce the size of magnetic powder and the magnetic powder recently used is a ferromagnetic powder of 0.1 $\mu$m or less or a ferromagnetic hexagonal ferrite fine powder having a tabular diameter of 40 nm or less. The dispersion of such ferromagnetic fine powder is difficult as compared with the dispersion of conventional ferromagnetic fine powder.

When the recording wavelength is shortened, if the magnetic layer thickness is large, the self demagnetization loss at the time of recording and the thickness loss at the time of reproduction come out to serious problems. In order to avoid the saturation of reproducing head, the magnetic layer is rendered thinner, however, if the thickness of the magnetic layer is reduced to about 0.5 $\mu$m or less, the effect of support is liable to appear on the magnetic layer surface and the electromagnetic characteristics and error rate are liable to increase. To overcome this problem, if a nonmagnetic lower layer is provided on the support surface and the magnetic layer is provided as the upper layer, the effect by the surface roughness of the support may be eliminated, however, since the thickness of the magnetic layer is very small of about 0.5 $\mu$m or less as compared with about 2 $\mu$m of the nonmagnetic lower layer, the surface property of the magnetic layer which comes into direct contact with the recording/reproducing head is greatly affected by the surface property of the nonmagnetic lower layer and the surface roughness of the magnetic upper layer cannot be get rid of the effect from the surface roughness of the nonmagnetic lower layer.

Use of an acrylic resin having a hydrophilic polar group as a binder in the magnetic layer has been proposed with an attempt to improve the dispersibility and this is certainly effective in the improvement of smoothness.

As for the magnetic recording medium comprising a support having provided thereon a magnetic layer and containing a (meth)acrylate-based copolymer as a binder of the magnetic layer, for example, the following techniques are known.

JP-A-4-176016 (the term "JP-A" as used herein means an "unexamined published Japanese patent application") discloses a magnetic recording medium containing an acrylic acid resin having a polar group and a molecular weight of 1,000 to 10,000 and a polyurethane resin as resin binders for the magnetic layer, where a hydroxyl group and a sulfonic acid (base) are described as the polar group and an oligoester mainly comprising a saturated aliphatic ester or ether bond of (meth)acrylic acid and an ester having a polyurethane or epoxy resin skeleton are described as the monomer for forming the skeleton of acrylic acid resin. In JP-A-4-176016, examples of the skeleton-forming monomer are set forth but the specific skeleton/composition is not described. The dispersibility is examined there only by taking notice of the molecular weight and the kind and amount of the polar group but the effect of the skeleton is not taken account of. The attained dispersibility is insufficient for the ultrafine magnetic powder used in recent magnetic recording mediums.

JP-A-6-111279 discloses a magnetic recording medium containing a mixture of polymethacrylic acid resin with polyurethane resin as a binder for the magnetic coating film and states that the polymethacrylic acid resin can be synthesized by the copolymerization of a methacrylic acid ester, an unsaturated monomer having —R—OH group, a monomer having —(O)SO$_3$X group and a copolymerizable unsaturated monomer, where the nitrogen-containing radical polymerizable unit described is only N-methylolacrylamide as an example of the unsaturated monomer having —R—OH group. As for the methacrylic acid ester, esters comprising a methacrylic acid and a saturated aliphatic alcohol having from 1 to 5 carbon atoms are described. Furthermore, specific examples of the copolymerizable unsaturated monomer are described but a methacrylic acid ester is not included therein. The polymethacrylic acid resin obtained by the copolymerization of a methacrylic acid ester comprising a methacrylic acid and a saturated aliphatic alcohol having from 1 to 5 carbon atoms with a monomer having —R—OH group or —(O)SO$_3$X group is insufficient in the dispersibility for the lower layer powder recently used in magnetic recording mediums.

Polyester polyurethane resin and polycarbonate polyurethane each having a urethane group concentration of 2.5 mmol/g or more are described as preferred examples of the polyurethane resin and with respect to the chain extending agent, those having a branched chain of 2 or more carbon atoms are not described.

In JP-A-6-111279, a polymethacrylic acid resin obtained by the copolymerization of a methacrylic acid ester comprising a methacrylic acid and a saturated aliphatic alcohol having from 1 to 5 carbon atoms, an unsaturated monomer having —R—OH group, a monomer having —(O)SO$_3$X group and a copolymerizable unsaturated monomer other than the methacrylic acid ester is used in combination with polyester polyurethane or polycarbonate polyurethane as the chain extending agent, not having a branched chain of 2 or more carbon atoms and having a urethane group concentration of 2.5 mmol/g, however, this technique cannot ensure the electromagnetic conversion characteristics necessary for the dispersibility of fine ferromagnetic metal powder having a long axis length of 0.1 μm or less or ferromagnetic hexagonal ferrite powder having a particle size of 40 nm or less which are recently used in ultra-thin layer magnetic recording particulate mediums capable of coping with MR head.

JP-A-7-220263 discloses a magnetic recording medium mainly using, as the binder for the magnetic layer, an acrylic copolymer comprising an ether compound-type monomer, a polar group-containing monomer and an acrylic monomer. An acrylic acid ester is not an essential component of the acrylic copolymer and moreover, an acrylic monomer containing an aromatic ring and nitrogen is not used in Examples. Only styrene is described as the aromatic ring-containing copolymerizable monomer but with styrene, a sufficiently high effect cannot be obtained.

JP-A-8-67855 discloses a magnetic recording medium containing, as the binder for the magnetic layer, a copolymer comprising a vinyl monomer having an acid group, a styrene-based monomer and/or a (meth)acrylic acid ester. In JP-A-8-67855, as examples of (meth)acrylic acid esters, those containing nitrogen are described but those containing an aromatic ring are not described. Thus, the improvement effect, for example, of dispersibility is insufficient.

JP-A-8-180366 discloses a magnetic recording medium containing a (meth)acrylic copolymer obtained by the copolymerization of a radical polymerizable monomer containing oxygen and nitrogen in the ring and having a heterocyclic group, and copolymerizable monomers each containing a hydroxyl group, a sulfonic acid group or the like, where a monomer containing a benzene ring and nitrogen is described as the (meth)acrylic monomer which can be used. However, the magnetic powder used in Examples is cobalt-γ-iron oxide and though an aromatic ring is contained, styrene described as the essential component cannot provide a sufficiently high effect with respect to the dispersibility of fine ferromagnetic powder or ferromagnetic hexagonal ferrite powder which are recently used in ultra-thin layer magnetic recording particulate mediums. Therefore, the required electromagnetic conversion characteristics or surface property of the medium cannot be ensured.

Furthermore, in the specification of JP-A-8-180366, specific examples of the polyurethane resin used in combination with the acrylic copolymer are not particularly described. Only N-2304 (produced by Nippon Polyurethane Co., Ltd.) is used in Examples, however, an ether group, a chain extending agent having 3 or more carbon atoms and a diol compound having a cyclic structure and a long alkyl chain are not used in N-2304.

In all of these JP-A-4-176016, JP-A-111279 and JP-A-8-180366, the effect is not sufficiently high with respect to the dispersibility of fine ferromagnetic metal powder having a long axis length of 0.1 μm or less or ferromagnetic hexagonal ferrite powder having a particle size of 40 nm or less which are recently used in ultra-thin layer magnetic recording particulate mediums capable of coping with MR head.

JP-A-9-69222, JP-A-11-39639 and JP-A-11-96539 relate to a magnetic recording medium containing in the magnetic layer a urethane resin having a specific structure.

JP-A-9-69222 is characterized by containing a urethane resin comprising from 10 to 50% by weight of polyether polyol, from 15 to 40% by weight of a short-chain diol having a ring structure and a polar group-containing polyol having Mw of 500 to 5,000.

JP-A-11-39639 is characterized by containing an aliphatic polyester polyol and a urethane comprising a branched aliphatic diol as the chain extending agent and having a urethane group content of 3 to 6 mmol/g.

JP-A-11-96539 is characterized by containing a urethane resin using a diol having a ring structure and a long alkyl chain.

In all of these JP-A-4-176016, JP-A-6-111279 and JP-A-8-180366, only vinyl chloride-based resins are used in Examples, though various resins are described as the resin which can be used in combination with polyurethane resin. The vinyl chloride-based resin generates trace chlorine or hydrogen chloride with the passing of time and corrodes metal-type ferromagnetic powder and head used in magnetic recording mediums and in turn, the electromagnetic characteristics is disadvantageously deteriorated in some cases.

Because of this, in the medium using fine ferromagnetic metal powder having a long axis length of 0.1 μm or less recently used in ultra-thin layer magnetic recording particulate mediums capable of coping with MR head, a problem is considered to arise in the storage stability.

In the combination use of this vinyl chloride-based resin with polyurethane resin, a sufficiently high effect cannot be obtained with respect to the dispersibility of fine ferromagnetic metal powder having a long axis length of 0.1 μm or less or ferromagnetic hexagonal ferrite powder having a particle size of 40 nm or less which are recently used in ultra-thin layer magnetic recording particulate mediums capable of coping with MR head, and therefore, it is estimated that the required electromagnetic conversion characteristics or surface properties of the medium are not ensured.

Furthermore, in all of the above-described patent publications, the specification is silent on the use of the resin in the nonmagnetic lower layer (powder body) and use of the resin is limited to the magnetic layer.

The acrylic resin is deficient in the flexibility because of less intermolecular interaction as compared with polyurethane resin and therefore, although various investigations are being made on the combination use with polyurethane resin, the results are not satisfied. More specifically, when an acrylic resin is used in a recording medium comprising a single magnetic layer, the deficient flexibility of the acrylic resin incurs poor head touch to generate spacing loss and as a result, the electromagnetic conversion characteristics are adversely affected. Also in the case of a multi-layer magnetic recording medium comprising a thin magnetic upper layer and a nonmagnetic lower layer, it has been found that when the acrylic resin is used in the magnetic upper layer which comes into direct contact with the recording/reproducing head, head touch failure may occur or the magnetic layer surface may be scratched due to repeated sliding by the head, giving rise to problems such as drop-out or contamination of head. Particularly, in high-density recording devices where recording signals of short wavelength are used and the cylinder rotation number, the magnetic tape transportation speed or the like is increased for reducing the speed of writing on or reading from the recording medium, contaminants adhere onto the magnetic head during repeated running of the tape, as a result, the reproduction output decreases, the error rate increases and the reliability for the recording or reproduction of data considerably lowers. This is presumed to occur because as compared with polyurethane resin or vinyl chloride-based resin, the acrylic resin is poor in the elasticity because of its less intermolecular interaction and therefore, the magnetic layer surface and/or edge face is scratched due to repeated sliding.

SUMMARY OF THE INVENTION

The object of the present invention is to provide a magnetic recording particulate medium having very excellent electromagnetic conversion characteristics and extremely high running durability.

More specifically, the object of the present invention is to provide a magnetic recording medium capable of maintaining high output and favored with smoothness and low error rate.

Still more specifically, the object of the present invention is to provide the following magnetic recording mediums:

(1) a recording medium having excellent electromagnetic conversion characteristics, where the nonmagnetic powder used in the lower layer or the ferromagnetic powder used in the magnetic layer has high dispersibility;

(2) a magnetic recording medium excellent in the smoothness of magnetic layer and in the electromagnetic conversion characteristics;

(3) a magnetic recording medium reduced in the scratching of the magnetic layer surface or head contamination and having excellent running durability; and (4) a magnetic recording medium exhibiting excellent storability under high-temperature and high-humidity conditions.

The present invention is as follows.

1. A first embodiment of the invention is a magnetic recording medium comprising a support having provided thereon a lower layer containing a nonmagnetic powder and a binder and further provided thereon at least one magnetic layer containing a ferromagnetic powder and a binder, wherein the lower layer contains as a binder at least a monomer unit comprising from 5 to 45% by weight of a (meth)acrylate unit containing a benzene ring and from 1 to 45% by weight of a radical polymerizable monomer unit containing a nitrogen atom, with these units making a total amount of 100% by weight, and also contains an acrylic resin having a hydrophilic polar group.

2. A second embodiment of the invention is a magnetic recording medium comprising a support having provided thereon at least one magnetic layer containing a ferromagnetic powder and a binder each in the dispersed state, wherein the magnetic layer contains at least a monomer unit comprising from 15 to 75% by weight of an alkyl (meth)acrylate as a binder and from 1 to 45% by weight of a radical polymerizable monomer unit containing nitrogen, with these units making a total amount of 100% by weight, and an acrylic resin having a hydrophilic polar group is used in combination with (A) a polyurethane resin having a hydrophilic group, obtained by reacting a polyether polyol containing a cyclic structure and an alkylene oxide chain and having a molecular weight of 500 to 5,000, a polyol containing a cyclic structure as a chain extending agent and having a molecular weight of 200 to 500, and an organic diisocyanate; (B) a polyurethane resin having a hydrophilic polar group, obtained by reacting a polyester polyol comprising an aliphatic dibasic acid and an aliphatic diol not containing a cyclic structure having a branched alkyl side chain, an aliphatic diol containing a branched alkyl side chain having 3 or more carbon atoms as a chain extending agent, and an organic diisocyanate compound; or (C) a polyurethane resin having a hydrophilic polar group, obtained by reacting a polyol compound containing a cyclic structure and long alkyl chain with an organic diisocyanate.

3. The magnetic recording medium as described in 2 above, wherein a lower layer containing a nonmagnetic powder and a binder is provided between the support and the magnetic layer.

4. The magnetic recording medium as described in 3 above, wherein the lower layer of 3 above contains a binder having the same meaning as the binder contained in the magnetic layer of 2 above.

5. The magnetic recording medium as described in any one of 1 to 4 above, wherein the ferromagnetic powder is a ferromagnetic metal powder having an average long axis length of 0.01 to 0.10 μm and a crystallite size of 80 to 180 Å or a ferromagnetic hexagonal ferrite powder having an average sheet size of 5 to 40 nm.

6. The magnetic recording medium as described in any one of 1 to 5 above, wherein the thickness of the magnetic layer is from 0.01 to 0.5 μm.

7. The magnetic recording medium as described in any one of 1 to 6 above, wherein the ferromagnetic metal powder mainly comprises Fe and contains, based on Fe, from 10 to 40 atm % of Co, from 2 to 20 atm % of Al and from 1 to 15 atm % of Y; the coercive force is from 2,000 to 3,000 oersted (Oe) (160 to 240 kA/m) and the saturation magnetization ($\sigma s$) is from 80 to 170 A·m$^2$/kg.

8. The magnetic recording medium as described in any one of 1 to 7 above, wherein the ferromagnetic hexagonal ferrite powder is a hexagonal barium ferrite having a coercive force of 2,000 to 3,000 Oe (160 to 240 kA/m) and a saturation magnetization ($\sigma s$) of from 40 to 80 A·m$^2$/kg.

9. The magnetic recording medium as described in any one of 1 to 8 above, wherein the magnetic recording medium is a magnetic disc or tape for recording digital signals, which is applied to an MR reproduction head-mounted recording/reproducing system.

DETAILED DESCRIPTION OF THE INVENTION

The constituent elements of the present invention are described one by one below.

I. Binder

The acrylic resin of the first embodiment of the invention is described below.

The magnetic recording medium of the present invention is characterized by containing a specific acrylic resin as the binder for forming a lower layer. The acrylic resin used here contains, as the monomer unit, at least a monomer unit comprising from 5 to 45% by weight of a (meth)acrylate unit having a benzene ring (hereinafter sometimes referred to as a "monomer a") and from 1 to 45% by weight of a nitrogen-containing radical polymerizable monomer (hereinafter sometimes referred to as a "monomer b"), with these units making a total of 100% by weight, and at the same time, has a hydrophilic polar group. The term "(meth)acrylate" as used herein is a generic term of acrylate and methacrylate.

The monomer constituting the acrylic resin is composed of a monomer a, a monomer b and other monomer (hereinafter sometimes referred to as "monomer c"). The other monomer may be one or more monomers. The monomer c is preferably radical-polymerizable.

Examples of the monomer a for use in the present invention include benzyl (meth)acrylate, phenoxyethyl (meth)acrylate, phenoxypolyethylene glycol (meth)acrylate and nonylphenol ethylene oxide adduct (meth)acrylate. Among these monomers a, preferred are benzyl (meth)acrylate and phenoxyethyl (meth)acrylate. The acrylic resin contains the monomer a unit in an amount of 5 to 45% by weight, preferably from 10 to 40% by weight. If the content of the monomer a unit is less than 5% by weight, the effect of improving the dispersibility of nonmagnetic powder cannot be obtained, for example, the lower layer and in turn the magnetic layer cannot have sufficiently high smoothness (gloss) or durability. On the other hand, if the content exceeds 45% by weight, the viscosity of the nonmagnetic coating material increases.

Examples of the monomer b for use in the present invention include (meth)acrylamide, diacetone (meth) acrylamide, N-methylol (meth)acrylamide, N-methoxymethyl (meth)acrylamide, N-ethoxymethyl (meth)acrylamide, N-butoxymethyl (meth)acrylamide, dimethylaminopropyl (meth)acrylamide, dimethylaminomethyl (meth)acrylate, dimethylaminoethyl (meth)acrylate, diethylaminomethyl (meth)acrylate, diethylaminoethyl (meth) acrylate, dimethylaminopropyl (meth)acrylate, (meth) acryloyl morpholine, morpholinoethyl (meth)acrylate, N-vinyloxazolidone, N-vinyl-2-pyrrolidone, N-vinylcarbazole, 2-vinyl-4,6-diamino-5-triazine, 2-vinylpyridine, 4-vinylpyridine, maleimide, N-phenylmaleimide and acrylonitrile. The acrylic resin contains the monomer b unit in an amount of 1 to 45% by weight, preferably from 2 to 40% by weight. If the content of the monomer b unit is less than 1% by weight, the effect of improving the dispersibility of nonmagnetic powder cannot be obtained, whereas if it exceeds 45% by weight, when used in combination with polyurethane resin, the compatibility with polyurethane resin and the solvent solubility are worsened.

Examples of the other copolymerizable monomer (monomer c) copolymerizable with the monomer a and the monomer b include alkyl (meth)acrylate; allyl glycidyl ether; alkyl vinyl ethers such as methyl vinyl ether, ethyl vinyl ether, isobutyl vinyl ether, n-butyl vinyl ether, 2-ethylhexyl vinyl ether, n-octyl vinyl ether, lauryl vinyl ether, cetyl vinyl ether and stearyl vinyl ether; alkoxyalkyl (meth)acrylates such as methoxyethyl (meth)acrylate and butoxyethyl (meth)acrylate; glycidyl (meth)acrylate; vinyl acetate; vinyl propionate; maleic acid (anhydride); acrylonitrile; and vinylidene chloride. Among these, alkyl (meth) acrylate and allyl glycidyl ether are preferred.

Specific examples of the alkyl (meth)acrylate include methyl (meth)acrylate, ethyl (meth)acrylate, propyl (meth) acrylate, butyl (meth)acrylate, isobutyl (meth)acrylate, pentyl (meth)acrylate, hexyl (meth)acrylate, octyl (meth) acrylate, 2-ethylhexyl (meth)acrylate, lauryl (meth)acrylate, stearyl (meth)acrylate and cyclohexyl (meth)acrylate. These monomers may be used either individually or in combination of two or more thereof.

In the acrylic resin, the total amount of the monomer (hereinafter referred to as "monomer c1") units comprising an alkyl (meth)acrylate or an allyl glycidyl ether is preferably from 15 to 75% by weight, more preferably from 20 to 70% by weight. If the total amount is less than 15% by weight, the solubility of a ketone or an ester of acrylic resin in an organic solvent may be inhibited, whereas if it exceeds 75% by weight, the obtained acrylic resin coating may have low strength.

The amount of the monomer c except for the monomer c1 contained in the acrylic resin is preferably 26% by weight per 100% by weight of the acrylic resin. If the amount exceeds this range, the copolymer decreases in the dynamical properties, dispersibility and the like.

The acrylic resin has a hydrophilic polar group. The hydrophilic polar group is not particularly limited insofar as it has a function of improving the dispersibility of the nonmagnetic powder. Preferred examples of the hydrophilic polar group include —$SO_3M$, —$PO(OM)_2$, —COOM (wherein M represents a hydrogen atom, an alkali metal or ammonium), an amino group and a quaternary ammonium salt group. Among these, —$SO3M$ is particularly preferred because of its excellent dispersibility. The content of the hydrophilic polar group is preferably from $1 \times 10^{-6}$ to $50 \times 10^{-5}$ eq/g, more preferably from $5 \times 10^{-6}$ to $20 \times 10^{-5}$ eq/g, based on the binder. If the content is less than $1 \times 10^{-6}$ eq/g, the effect cannot be obtained, whereas if it exceeds $50 \times 10^{-5}$ eq/g, the viscosity of the coating material elevates to seriously deteriorate the workability and render the handling difficult. The acrylic resin may have two or more hydrophilic polar groups, for example, may have —COOM in addition to —$SO_3M$.

The hydrophilic polar group may be introduced into the acrylic resin, for example, by a method of addition-reacting a compound having a hydrophilic polar group with a (meth) acrylate-based copolymer comprising the monomer a unit, the monomer b unit and the monomer c unit and not containing a hydrophilic polar group and thereby introducing the hydrophilic polar group. More specifically, —$SO_3M$ may be introduced into the (meth)acrylate-based copolymer by a method where the monomer a, the monomer b and the monomer c containing at least a copolymerizable monomer having a glycidyl group are copolymerized and simultaneously with the copolymerization or after the copolymer is obtained, the copolymer is reacted with a compound having —$SO_3M$ and capable of reacting with a glycidyl group. Examples of the copolymerizable monomer having a glycidyl group include glycidyl (meth)acrylate and allyl glycidyl ether. These may be used individually, or two or more thereof may be simultaneously used in combination. Examples of the compound having —$SO_3M$ and a glycidyl group include sulfurous acid and sulfites such as sodium sulfite, sodium bisulfite, potassium sulfite and ammonium sulfite; sulfuric acid and hydrogen sulfates such as sodium hydrogensulfate, potassium hydrogensulfate and ammonium hydrogen sulfate; and aminosulfonic acids such as taurine, sodium taurine, potassium taurine, ammonium taurine, sulfamic acid, sodium sulfamate, potassium sulfamate, ammonium sulfamate, sulfanilic acid, sodium sulfanilate, potassium sulfanilate and ammonium sulfanilate.

The acrylic acid may also be produced using a compound having a hydrophilic polar group as the monomer c by copolymerizing the monomer c together with the monomer a and monomer b. Among the copolymerizable monomers containing a hydrophilic polar group, examples of the copolymerizable monomer used for introducing —$SO_3M$ include unsaturated hydrocarbon sulfonic acid and salts thereof, such as 2-acrylamido-2-methylpropanesulfonic acid, vinylsulfonic acid, (meth)acrylsulfonic acid and p-styrenesulfonic acid; and sulfoalkyl esters of (meth) acrylic acid and salts thereof, such as sulfoethyl (meth) acrylate and sulfopropyl (meth)acrylate. In the case where —COOM must be introduced in addition to —$SO_3M$, copolymerizable monomers containing —COOM, specifically, (meth)acrylic acid, maleic acid and salts thereof may be used.

The above-described hydrophilic polar group may be introduced into the (meth)acrylate-based copolymer at the production of the (meth)acrylate-based copolymer by a method of copolymerizing a monomer mixture using a hydrophilic polar group-containing radical polymerization initiator or a method of copolymerizing a monomer mixture in the presence of a chain transfer agent having a hydrophilic polar group at one terminal.

Examples of the hydrophilic polar group-containing radical polymerization initiator include ammonium persulfate, potassium persulfate and sodium persulfate. The amount of this radical polymerization initiator is suitably from 1 to 10% by weight, preferably from 1 to 5% by weight, based on the total amount of monomers.

The chain transfer agent having a hydrophilic polar group at one terminal is not particularly limited insofar as it can undertake the chain transfer upon polymerization reaction and at the same time, contains a hydrophilic polar group at one terminal, but examples thereof include halogenated compounds and mercapto compounds having a hydrophilic polar group at one terminal, and diphenyl picryl hydrazine. Specific examples of the halogenated compound include 2-chloroethanesulfonic acid, sodium 2-chloroethanesulfonate, 4-chlorophenylsulfoxide, 4-chlorobenzenesulfonamide, p-chlorobenzenesulfonic acid, sodium p-chlorobenzenesulfonate, sodium 2-bromoethanesulfonate and sodium 4-(bromomethyl) benzenesulfonate. Among these, sodium 2-chloroethanesulfonate and sodium p-chlorobenzenesulfonate are preferred. Examples of the mercapto compound which is preferably used include 2-mercaptoethanesulfonic acid (salt) (the term "(salt)" as used herein means that the compound includes the salt form), 3-mercapto-1,2-propanediol, mercaptoacetic acid (salt), 2-mercapto-5-benzoimidazolesulfonic acid (salt), 3-mercapto-2-butanol, 2-mercaptobutanol, 3-mercapto-2-propanol, N-(2-mercaptopropyl)glycine, ammonium thioglycolate and β-mercaptoethylamine hydrochloride. These chain transfer agents having a hydrophilic polar group at one terminal can be used individually or in combination of two or more thereof. The chain transfer agent having a hydrophilic polar group at one terminal which is particularly preferably used is 2-mercaptoethanesulfonic acid (salt) having strong polarity. The amount of the chain transfer agent used is from 0.1 to 10% by weight, preferably from 0.2 to 5% by weight, based on the total amount of monomers.

Furthermore, it is also preferred to copolymerize a copolymerizable hydrophilic group-containing monomer as the monomer c and thereby introduce the hydroxyl group to form the hydrophilic polar group of the present invention together with —$SO_3M$ or the like. In the present invention, the hydrophilic polar group may also be introduced into the monomer a or b. Examples of the copolymerizable hydrophilic group-containing monomer include hydroxyalkyl (meth)acrylates such as hydroxyethyl (meth)acrylate, hydroxypropyl (meth)acrylate, polyethylene glycol mono (meth)acrylate, polypropylene glycol mono(meth)acrylate, polyethylene glycol polypropylene glycol mono(meth) acrylate, glycerol mono(meth)acrylate and 3-chloro-2-hydroxypropyl (meth)acrylate; vinyl ethers such as hydroxyethyl vinyl ether, hydroxypropyl vinyl ether and hydroxybutyl vinyl ether; (meth)allyl ethers such as hydroxyethyl mono(meth)allyl ether, hydroxypropyl mono (meth)allyl ether, hydroxybutyl mono(meth)allyl ether, diethylene glycol mono(meth)allyl ether, dipropylene glycol mono(meth)allyl ether, glycerol mono(meth)allyl ether and 3-chloro-2-hydroxypropyl (meth)allyl ether; and (meth)allyl alcohol. A hydroxyl group based on vinyl alcohol may also be introduced by copolymerizing vinyl acetate and saponifying the copolymer with caustic alkali in a solvent. The amount of the monomer having a hydroxyl group is preferably adjusted to from 1 to 30% by weight in all monomers.

The number average molecular weight of the acrylic resin is preferably from 1,000 to 200,000, more preferably from 10,000 to 100,000. If the number average molecular weight is less than 1,000, the physical strength of the obtained magnetic recording medium decreases and the durability thereof is also affected, whereas if it exceeds 200,000, the viscosity of the coating material elevates at a predetermined concentration to seriously deteriorate the workability and render the handling difficult.

For polymerizing a polymerization reaction system containing the above-described polymerizable monomers and chain transfer agent, a well-known polymerization method such as suspension polymerization, emulsion polymerization or solution polymerization can be used. Among these polymerization methods, preferred are suspension polymerization and emulsion polymerization having good dry workability, more preferred is emulsion polymerization, because the obtained acrylic resin can be easily stored in the solid state ensuring high storage stability. The polymerization conditions vary depending on the kind of the polymerizable monomers, polymerization initiator and chain transfer agent used, however, the preferred polymerization conditions in an autoclave are generally such that the temperature is approximately from 50 to 80° C., the gauge pressure is approximately from 4.0 to 1.0 MPa, and the time period is approximately from 5 to 30 hours. The polymerization is preferably performed in an atmosphere of a gas inert to the reaction because the reaction can be easily controlled. Examples of this gas include nitrogen and argon, with nitrogen being preferred in view of profitability. At the polymerization, components other than the above-described components may also be added to the polymerization reaction system. Examples of such components include an emulsifier, an electrolyte and polymer protective colloid.

In the present invention, polyurethane resin can be used in combination as a binder, if desired. The polyurethane resin used in combination preferably has the above-described hydrophilic polar group. The polyurethane resin having introduced thereinto a hydrophilic polar group can be produced from a hydrophilic polar group-containing polyol such as hydrophilic polar group-containing polyester polyol, polycarbonate polyol or polyether polyol; a hydrophilic polar group-free polyol such as hydrophilic polar group-free polyester polyol, polycarbonate polyol or polyether polyol and diisocyanate. The hydrophilic polar group-containing polyol has the hydrophilic polar group in the main or side chain of polyol. The hydrophilic polar group-containing polyol can be produced, for example, by replacing a part of the following dihydric alcohol or dibasic acid with a hydrophilic polar group-containing diol or hydrophilic polar group-containing dibasic acid. Examples of the hydrophilic polar group-containing diol include EO (ethylene oxide) adducts and PO (propylene oxide) adducts of sulfo(iso or tere)phthalic acid (this may be in the form of Na or K salt), and EO adducts and PO adducts of sulfamic acids such as aminoethanesulfonic acid. Examples of the hydrophilic polar group-containing dibasic acid include 5-sodiumsulfoisophthalic acid, 5-potassiumsulfoisophthalic acid, 5-sulfoisophthalic acid, 2-sodiumsulfoterephthalic acid, 2-potassiumsulfoterephthalic acid and 2-sulfoterephthalic acid.

Examples of the polyester polyol include those obtained by the polycondensation of a dihydric alcohol and a dibasic acid and those obtained by the ring-opening polymerization of lactones such as caprolactone. Representative examples of the dihydric alcohol include glycols such as ethylene glycol, propylene glycol, butane diol, 1,6-hexane diol and cyclohexane dimethanol. Representative examples of the dibasic acid include adipic acid, pimelic acid, azelaic acid, sebacic acid, phthalic acid and terephthalic acid.

The polycarbonate polyol is a polycarbonate polyol having a molecular weight of 300 to 20,000 and a hydroxyl group valence of 200 to 300 synthesized by the condensation or transesterification between a polyhydric alcohol and phosgene, chloroformic acid ester, dialkyl carbonate or diallyl carbonate, or a polycarbonate polyester polyol having a molecular weight of 400 to 30,000 and a hydroxyl group valence of 5 to 300 obtained by the condensation between the above-described polycarbonate polyol and a dihydric carboxylic acid.

Examples of the polyether polyol which can be used include polyethylene oxide and/or polypropylene oxide adducts such as bisphenol A, hydrogenated bisphenol A, bisphenol S and bisphenol P, and polyether polyols having a molecular weight of 500 to 5,000 such as polypropylene glycol, polyethylene glycol and polytetramethylene glycol. The polyether polyol is preferably bisphenol A, hydrogenated bisphenol A or a polyether polyol as an ethylene oxide or propylene oxide adduct thereof having an ether group content of 25 to 45% by weight, more preferably from 30 to 40% by weight. If the ether group content is less than 25% by weight, the solubility in a solvent decreases and therefore, the dispersibility lowers, whereas if it exceeds 45% by weight, the coated film strength lowers and therefore, the durability decreases.

In combination with this polyol, other polyol may be used up to 90% by weight of the above-described polyol.

The polyisocyanate used to react with the above-described polymer to form polyurethane is not particularly limited and polyisocyanates in common use can be used. Examples thereof include hexamethylene diisocyanate, tridine diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthalene diisocyanate and 3,3-dimethylphenylene diisocyanate.

Examples of the chain transfer agent which can be used include a substance which itself is known, a polyhydric alcohol, an aliphatic polyamine, an alicyclic polyamine and an aromatic polyamine. Among these, a polyhydric alcohol having a molecular weight of 50 to 500 is preferred. If the molecular weight is less than 50, the formed coated film is fragile and the durability is liable to lower, whereas if it exceeds 500, the coated film is softened due to decrease of Tg and therefore, the durability is liable to lower. The polyhydric alcohol is preferably a short chain diol having a cyclic structure, such as bisphenol A, hydrogenated bisphenol A, bisphenol S, bisphenol P, an ethylene oxide or propylene oxide adduct thereof, cyclohexane dimethanol, cyclohexane diol, hydroquinone, bis(2-hydroxyethyl) tetrabromobisphenol A, bis(2-hydroxyethyl) tetrabromobisphenol S, bis(2-hydroxyethyl) tetramethylbisphenol S, bis(2-hydroxyethyl) diphenylbisphenol S, bis(2-hydroxyethyl) diphenylbisphenol, bis(2-hydroxyethyl)thiodiphenol, bis(2-hydroxyethyl)bisphenol F, biphenol, bisphenolfluorene or bisphenolfluorene dihydroxyethyl ether, more preferably an aromatic diol or an alicyclic diol, such as bisphenol A, hydrogenated bisphenol A, bisphenol S, bisphenol P, an ethylene oxide or propylene oxide adduct thereof, cyclohexane dimethanol or cyclohexane diol.

The average molecular weight of the hydrophilic polar group-containing polyurethane-based resin for use in the present invention is preferably from 5,000 to 100,000, more preferably from 10,000 to 50,000. If the average molecular weight is less than 5,000, the physical strength lowers, for example, the obtained coated film becomes fragile, and this may affect the durability of the magnetic recording medium, whereas if the molecular weight exceeds 100,000, the solubility in a solvent lowers and the dispersibility is liable to decrease. Furthermore, the viscosity of the coating material is elevated at a predetermined concentration to conspicuously worsen the workability and render the handling difficult.

The OH group of the hydrophilic polar group-containing polyurethane-based resin for use in the present invention is preferably a branched OH group in view of curability and durability. The number of OH groups is preferably from 2 to 40, more preferably from 3 to 20, per one molecule.

In the present invention, when a hydrophilic polar group-containing polyurethane-based resin is used in combination as a binder for forming the lower layer, the proportion thereof is preferably from 5 to 900 parts by weight per 100 parts by weight of the acrylic resin.

In the binder, a polyisocyanate may also be used as a crosslinking agent. Examples of the polyisocyanate which can be used as a crosslinking agent include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, products of these isocyanates with polyalcohol, and polyisocyanates produced by the condensation of isocyanates. These isocyanates are commercially available under the trade names of Coronate L, Coronate HL, Coronate 2030, Coronate 2031, Millionate MR, Millionate MTL (all produced by Nippon Polyurethane Co., Ltd.), Takenate D-102, Takenate D-110N, Takenate D-200, Takenate D-202 (all produced by Takeda Chemical Industries, Ltd.), Desmodur L, Desmodur IL, Desmodur N and Desmodur HL (all produced by Sumitomo Bayer Co., Ltd.). These isocyanates may be used individually or in combination of two or more thereof by making use of difference in the curability in respective layers.

In the present invention, other resin may further be used in combination as a binder for use in the lower layer, in addition to the acrylic resin and the polar group-containing polyurethane-based resin. The resin used in combination is usually in an amount equivalent to or lower than the total amount of these resins. A resin having a hydrophilic polar group is preferred. The other resin which can be used in combination is not particularly limited and a well-known thermoplastic resin, thermosetting resin or reactive resin conventionally used as a binder, or a mixture thereof can be used. The thermoplastic resin for use in the present invention has a glass transition temperature of −100 to 150° C., a number average molecular weight of from 1,000 to 200,000, preferably from 10,000 to 100,000. Specific examples thereof include polymers or copolymers containing vinyl chloride, vinylidene chloride, acrylonitrile, styrene, butadiene, ethylene, vinyl butyral, vinyl acetal, vinyl ether or the like as a constituent unit, and various rubber-based resins. Examples of the thermosetting resin and reactive resin include phenol resin, phenoxy resin, epoxy resin, urea resin, melamine resin, alkyd resin, acryl-based reactive resin, formaldehyde resin, silicone resin, epoxy-polyamide resin, and a mixture of polyester resin and isocyanate prepolymer.

In the first embodiment of the invention, the acrylic resin may be added to the magnetic layer. The binder used in the magnetic layer is the same acrylic resin of the second embodiment of the invention or a conventionally known binder. That is, the polar group-containing polyurethane-based resin used in the above-described lower layer, a well-known thermoplastic resin, thermosetting resin or reactive resin, or a mixture thereof may be used. These known resins are described above as examples of the resin other than the acrylic resin, which can be used in combination.

The binder of the second embodiment of the invention is described below.

In the magnetic recording medium of the present invention, a specific acrylic resin and a specific polyurethane resin are used in combination as the binder of the magnetic layer. This binder is preferably used also for forming the lower layer.

a. Acrylic Resin

The acrylic resin used here contains at least a monomer unit comprising from 15 to 75% by weight of an alkyl (meth)acrylate unit and from 1 to 45% by weight of a nitrogen-containing radical polymerizable monomer unit, with these units making a total amount of 100% by weight, and at the same time, has a hydrophilic polar group.

The acrylic resin described in the second embodiment of the invention and the acrylic resin described in the first embodiment of the invention are the same in the fundamental structure but differ in the essential monomer units.

That is, a (meth)acrylate unit having a benzene ring is essential in the first embodiment of the invention, whereas an alkyl (meth)acrylate unit is instead essential in the second embodiment of the invention. The other copolymerizable monomer which can be copolymerized is preferably a (meth)acrylate having a benzene ring, similarly to the above-described acrylic resin.

Specific examples of the alkyl (meth)acrylate, the nitrogen-containing radical polymerizable monomer and the (meth)acrylate having a benzene ring for use in the present invention are the same as those for the above-described acrylic resin. Furthermore, the preferred range of the blending ratio of each monomer component and the kind and amount of the hydrophilic polar group are also the same as those for the above-described acrylic resin.

b. Polyurethane Resin

The polyurethane resin used in combination is (A) a polyurethane resin having a hydrophilic group, obtained by reacting a polyether polyol containing a cyclic structure and an alkylene oxide chain and having a molecular weight of 500 to 5,000, a polyol containing a cyclic chain as a chain extending agent and having a molecular weight of 200 to 500, and an organic diisocyanate; (B) a polyurethane resin having a hydrophilic polar group, obtained by reacting a polyester polyol comprising an aliphatic dibasic acid and an aliphatic diol not containing a cyclic structure having a branched alkyl side chain, an aliphatic diol containing a branched alkyl side chain having 3 or more carbon atoms as a chain extending agent, and an organic diisocyanate compound; or (C) a polyurethane resin having a hydrophilic polar group, obtained by reacting a polyol compound containing a cyclic structure and a long alkyl chain with an organic diisocyanate. In the present invention, the acrylic resin is used in combination with one or more of the polyurethane resins (A), (B) and (C), whereby the obtained magnetic recording medium can have excellent properties in the magnetic characteristics, smoothness of the magnetic recording medium, electromagnetic conversion characteristics, durability and storability.

The polyurethane resin (A) is described in detail.

(1) Polyether polyol containing a cyclic structure and an alkylene oxide chain and having a molecular weight of 500 to 5,000:

Polyether polyols obtained by adding an alkylene oxide such as ethylene oxide or propylene oxide, to the following diol containing a cyclic structure can be used.

Examples of the diol having a cyclic structure include bisphenol A, hydrogenated bisphenol A, bisphenol S, hydrogenated bisphenol S, bisphenol P, hydrogenated bisphenol P, tricyclodecane dimethanol, cyclohexane dimethanol, cyclohexane diol, 5,5'-(1-methylethyliene) bis-(1,1'-bicyclohexyl)-2-ol, 4,4'-(1-methylethylidene)bis-2-methylcyclohexanol, 5,5'-(1,1'-cyclohexylidene)bis-(1,1'-bicyclohexyl)-2-ol, 5,5'-(1,1'-cyclohexylmethylene)bis-(1,1'-bicyclohexyl)-2-ol, hydrogenated terpene diphenol, diphenyl bisphenol A, diphenyl bisphenol S, diphenyl bisphenol P, 9,9-bis-(4-hydroxyphenyl)fluorene, 4,4'-(3-methylethylidene)bis(2-cyclohexyl-5-methylphenol), 4,4'-(3-methylethylidene(bis(2-phenyl-5-methylcyclohexanol), 4,4'-(1-phenylethylidene)bis(2-phenol), 4,4'-cyclohexylidenebis(2-methylphenol) and terpene diphenol.

The polyether polyol in (1) is preferably hydrogenated bisphenol A or a polypropylene oxide adduct of hydrogenated bisphenol A and preferably has a molecular weight of 500 to 5,000. If the molecular weight is less than 500, the urethane group concentration elevates and therefore, the solubility in a solvent decreases, whereas if it exceeds 5,000, the coated film strength lowers and the durability decreases in some cases.

2) Polyol containing a cyclic structure and having a molecular weight of 200 to 500:

The diol containing a cyclic structure described in (1) above or the diol added with an alkylene oxide such as ethylene oxide or propylene oxide to a molecular weight of 200 to 500 can be used.

Preferred examples of the polyol containing a cyclic structure and having a molecular weight of 200 to 500 include hydrogenated bisphenol A and propylene oxide adduct of hydrogenated bisphenol A.

The polyurethane resin (B) is described in detail.

(1) Aliphatic dibasic acid

Examples of the aliphatic dibasic acid which can be used for the formation of the polyester polyol component include aliphatic dibasic acids such as succinic acid, adipic acid, azelaic acid, sebacic acid, malonic acid, glutaric acid, pimeric acid and suberic acid. Among these, preferred are succinic acid, adipic acid and sebacic acid.

The polyester polyol component of the polyurethane resin (B) may contain an aromatic dibasic acid in addition to the aliphatic dibasic acid but the content of the aliphatic dibasic acid preferably occupies 70 mol % or more in all dibasic acid components of the polyester polyol. If the content is less than 70 mol %, the dibasic acid components having a cyclic structure, such as aromatic dibasic acid, substantially increase, as a result, the solubility in a solvent lowers and the dispersibility decreases in some cases.

(2) Aliphatic diol not containing a cyclic structure having a branched alkyl side chain:

Examples of the aliphatic diol not containing a cyclic structure having a branched alkyl side chain include 2,2-dimethyl-1,3-propanediol, 3,3-dimethyl-1,5-pentanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6- hexanediol, 2-propyl-1,6-hexanediol, 2-butyl-1,6-hexanediol, 5-ethyl-1,9-nonanediol, 5-propyl-1,9-nonanediol and 5-butyl-1,9-nonanediol. Among these, 2,2-dimethyl-1,3-propanediol, 2-ethyl-2-butyl-1,3-propanediol and 2,2-diethyl-1,3-propanediol are preferred.

The polyester polyol component of the polyurethane resin (B) may contain other polyol in addition to the above-described diol but the content of the diol preferably occupies from 50 to 100 mol %, more preferably from 70 to 100 mol %, in all polyols.

3) Aliphatic diol containing a branched alkyl side chain having 3 or more carbon atoms as a chain extending agent:

Examples of this diol which can be used as a chain extending agent include 2-methyl-2-ethyl-1,3-propanediol, 3-methyl-3-ethyl-1,5-pentanediol, 2-methyl-2-propyl-1,3-propanediol, 3-methyl-3-propyl-1,5-pentnediol, 2-methyl-2-butyl-1,3-propanediol, 3-methyl-3-butyl, 1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-rpopanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentnediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol and 5-butyl-1,9-nonanediol. Among these, preferred are 2-ethyl-2-butyl-1,3-propanediol and 2,2-diethyl-1,3-propanediol. The content of this diol in the polyurethane resin (B) is preferably from 5 to 30% by weight, more preferably from 10 to 20% by weight.

Polyurethane Resin (C):

(1) Polyol compound containing a cyclic structure and a long alkyl chain:

The polyol compound containing a cyclic structure and a long alkyl chain is preferably a diol and preferably has a molecular weight of 500 to 1,000. If the molecular weight is less than 500, the diisocyanate content substantially increases and the urethane group concentration increases, as a result, the solubility in a solvent decreases in some cases, whereas if it exceeds 1,000, the coated film strength sometimes lowers.

The polyol compound containing a cyclic structure and a long alkyl chain is preferably a dimer diol having a structure shown below, which is obtained by hydrogenating and reducing a dimer acid.

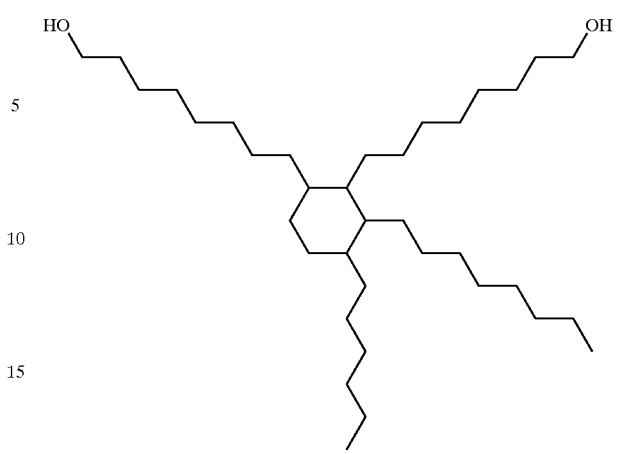

The content of the polyol compound containing a cyclic structure and a long alkyl chain is preferably 5% by weight or more, more preferably from 10 to 40% by weight, in the polyurethane resin.

The polyisocyanate used for forming the polyurethane resin by reacting it with each polyol in the polyurethane resins (A), (B) and (C) (hereinafter, when these three resins are collectively called, these are referred to as "the polyurethane resin for the present invention") is not particularly limited and those commonly used can be used. Examples thereof include hexamethylene diisocyanate, tridine diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthalene diisocyanate and 3,3-dimethylphenylene diisocyanate.

The polyurethane resin for the present invention preferably has the same polar group as in the above-described acrylic resin.

The polyurethane resin for he present invention, where a polar group is introduced, can be produced from a polar group-containing compound such as polyester polyol or polyether polyol having a polar group, the above-described polyol or the like, and a diisocyanate. The polar group-containing compound can be produced, for example, by replacing a part of a dihydric alcohol or a dibasic acid with a polar group-containing diol or a polar group-containing dibasic acid.

In the polyurethane resin (C), a chain extending agent can also be used. Examples of the chain extending agent which can be used include a substance which itself is known, a polyhydric alcohol, an aliphatic polyamine, an alicyclic polyamine and an aromatic polyamine. Among these, a polyhydric alcohol having a molecular weight of 50 to 500 is preferred. If the molecular weight is less than 50, the formed coated film is fragile and the durability is liable to lower, whereas if it exceeds 500, the coating is softened due to decrease of Tg and therefore, the durability is liable to lower. The polyhydric alcohol is preferably a short chain diol having a cyclic structure, such as bisphenol A, hydrogenated bisphenol A, bisphenol S, bisphenol P, an ethylene oxide or propylene oxide adduct thereof, cyclohexane dimethanol, cyclohexane diol, hydroquinone, bis(2-hydroxyethyl)tetrabromobisphenol A, bis(2-hydroxyethyl) tetrabromobisphenol S, bis(2-hydroxyethyl) tetramethylbisphenol S, bis(2-hydroxyethyl)

diphenylbisphenol S, bis(2-hydroxyethyl) diphenylbisphenol, bis(2-hydroxyethyl)thiodiphenol, bis(2-hydroxyethyl)bisphenol F, biphenol, bisphenolfluorene or bisphenolfluorene dihydroxyethyl ether, more preferably an aromatic diol or an alicyclic diol, such as bisphenol A, hydrogenated bisphenol A, bisphenol S, bisphenol P, an ethylene oxide or propylene oxide adduct thereof, cyclohexane dimethanol or cyclohexane diol.

Also in the polyurethane resins (A) and (B), a chain extending agent other than the chain extending agent as an essential component may be used and this may be selected from the above-described chain extending agents.

The average molecular weight of the polyurethane resin for use in the present invention is preferably from 5,000 to 100,000, more preferably from 10,000 to 50,000. If the average molecular weight is less than 5,000, the physical strength lowers, for example, the obtained coated film becomes fragile, and this is liable to affect the durability of the magnetic recording medium, whereas if the molecular weight exceeds 100,000, the solubility in a solvent lowers and the dispersibility is liable to decrease. Furthermore, the viscosity of the coating material is elevated at a predetermined concentration to conspicuously worsen the workability and render the handling difficult.

The polyurethane resin for use in the present invention preferably has an OH group in view of curability and durability. The number of OH groups is preferably from 2 to 40, more preferably from 3 to 20, per one molecule.

In the present invention, other binder having a polar group may be used in combination in an amount equivalent to or lower than the total amount of the above-described acrylic resin and the polyurethane resin for the present invention. The other binder which can be used in combination is not particularly limited and a well-known thermoplastic resin, thermosetting resin or reactive resin conventionally used as a binder, or a mixture thereof may be used. The thermoplastic resin has a glass transition temperature of −100 to 150° C., a number average molecular weight of 1,000 to 200,000, preferably from 10,000 to 100,000. Specific examples thereof include polymers or copolymers containing vinyl chloride, vinylidene chloride, acrylonitrile, styrene, butadiene, ethylene, vinyl butyral, vinyl acetal, vinyl ether or the like as a constituent unit, and various rubber-based resins. Examples of the thermosetting resin and the reactive resin include phenol resin, phenoxy resin, epoxy resin, urea resin, melamine resin, alkyd resin, acrylic reactive resin, formaldehyde resin, silicone resin, epoxypolyamide resin, and a mixture of polyester resin and isocyanate prepolymer.

II. Ferromagnetic Powder

The ferromagnetic powder for use in the present invention is not particularly limited but ferromagnetic metal powder and hexagonal ferrite powder are preferred.

Ferromagnetic Metal Powder

The ferromagnetic metal powder for use in the present invention is not particularly limited insofar as the powder mainly comprises Fe (including alloy) but a ferromagnetic alloy powder mainly comprising α-Fe is preferred. The ferromagnetic metal powder may contain, in addition to the predetermined atom, an atom such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. Among these, at least one of Al, Si, Ca, Y, Ba, La, Nd, Co, Ni and B is preferably contained in addition to α-Fe. In particular, Co, Al or Y is preferably contained. More specifically, from 10 to 40 atm % of Co, from 2 to 20 atm % of Al and from 1 to 15 atm % of Y are preferably contained based on Fe.

The ferromagnetic metal powder may be dispersed after previously treating it with a dispersant, a lubricant, a surfactant or an antistatic agent which will be described later. The ferromagnetic metal powder may contain a slight amount of water, hydroxide or oxide. The water content of the ferromagnetic metal powder is preferably from 0.01 to 2%. The water content of the ferromagnetic metal powder is preferably optimized according to the kind of the binder.

The crystallite size of the nonmagnetic powder is preferably from 80 to 180 Å, more preferably from 100 to 180 Å, still more preferably from 120 to 160 Å. The crystallite size used here is an average value determined from the peak width at half height in the diffraction peak by Scherrer method using an X-ray diffraction apparatus (RINT 2000 series, manufactured by Rigaku Denki) under the conditions such that the ray source is CuKα1, the tube voltage is 50 kV and the tube current is 300 mA.

The average long axis length of the ferromagnetic metal powder is preferably from 0.01 to 0.10 μm, more preferably from 0.03 to 0.09 μm still more preferably from 0.05 to 0.08 μm. If the average long axis length is less than 0.01 μm, stable magnetization cannot be obtained due to thermal fluctuation, whereas if the average long axis length exceeds 0.10 μm, noises increase. Thus, either case is not suitable. The average long axis is determined by the method of taking a photograph through a transmission electron microscope and reading the short axis length and the long axis length of the ferromagnetic metal powder directly from the photograph.

The specific surface area by BET method ($S_{BET}$) of the ferromagnetic metal powder used in the magnetic layer of the present invention is preferably from 30 to less than 50 $m^2/g$, more preferably from 38 to 48 $m^2/g$. With this specific surface area, good surface property and low noise can be attained at the same time.

The pH of the ferromagnetic metal powder is preferably optimized by the combination with the binder used. The optimal pH is usually from 4 to 12, preferably from 7 to 10. The ferromagnetic metal powder may be surface-treated with surface treating agents such as Al, Si, P or an oxide thereof, if desired. The amount of the surface treating agent is from 0.1 to 10% based on the ferromagnetic metal powder and by the surface treatment, the adsorption of a lubricant such as fatty acid is advantageously reduced to 100 $mg/m^2$ or less. The ferromagnetic metal powder sometimes contains soluble inorganic ion such as Na, Ca, Fe, Ni and Sr, however, if the content thereof is 200 ppm or less, the effect thereof on the properties is negligible. The ferromagnetic metal powder for use in the present invention preferably has a smaller number of holes and the occupation thereof in percentage is preferably 20% by volume or less, more preferably 5% by volume or less.

With respect to the shape, the ferromagnetic metal powder may have any shape of acicular, granular, pebble (i.e., ellipsoidal) and tabular forms insofar as the requirements for particle size can be satisfied. In particular, an acicular ferromagnetic powder is preferably used. In the case of acicular ferromagnetic powder, the average acicular ratio (arithmetic mean of acicular ratios (long axis length/short axis length)) is preferably from 4 to 12, more preferably from 5 to 12.

The coercive force Hc of the ferromagnetic metal powder is preferably from 2,000 to 3,000 Oe (160 to 240 kA/m), more preferably from 2,100 to 2,900 Oe (170 to 230 kA/m).

The saturation magnetization (σs) is preferably from 80 to 170 A·m²/kg, more preferably from 90 to 150 A·m²/kg.

Ferromagnetic Hexagonal Ferrite Powder

In the case of performing the reproduction using particularly a magnetic resistance head so as to increase the track density, the noise must be reduced. For this purpose, the ferromagnetic hexagonal ferrite powder for use in the present invention preferably has an average tabular diameter of 5 to 40 nm. If the average tabular diameter is less than 5 nm, stable magnetization cannot be obtained due to thermal fluctuation. The average tabular diameter is more preferably from 10 to 35 nm, still more preferably from 15 to 30 nm.

The average tabular ratio {arithmetic mean of tabular ratios (tabular diameter/tabular thickness)} is preferably from 1 to 15, more preferably from 1 to 7. If the average tabular ratio is less than this range, the filling property in the magnetic layer advantageously increases but satisfactory orientation cannot be obtained, whereas if it exceeds 15, noises increase due to stacking among grains. With the grain size in this range, the specific surface area by the BET method is from 10 to 200 m²/g. This specific surface area substantially coincides with the arithmetic operation value. The grain tabular diameter tabular thickness is usually preferred to have a narrower distribution. The grain tabular diameter and the tabular thickness are determined by measuring 500 grains on a TEM photograph of gains. The distribution is not normal in many cases but when calculated and expressed by a standard deviation to the average size, σ/average size=0.1 to 2.0. For obtaining a sharp grain size distribution, the grain forming reaction system is rendered uniform as much as possible and the produced grains are subjected to a distribution improving treatment. For example, a method of selectively dissolving superfine grains in an acid solution is known.

The magnetic powder can be manufactured to have a measured coercive force Hc of approximately from 500 to 5,000 Oe (40 kA/m to 400 kA/m). A higher Hc is more advantageous for the high density recording but this is limited by the ability of recording head. In the present invention, the Hc is preferably on the order of 2,000 to 3,000 Oe (160 to 240 kA/m), more preferably from 2,200 to 2,800 Oe (175 to 220 kA/m). In the case where the saturation magnetization of the head exceeds 1.4 T, the Hc is preferably 2,000 Oe (160 kA/m) or more. The Hc can be controlled by the grain size (tabular diameter·tabular thickness), the kind and amount of elements contained, the substitution site of elements, the reaction conditions in the grain formation or the like. The saturation magnetization (σs) is preferably 40 to 80 A·m²/kg. The σs is preferably higher but as the grain is finer, the σs is liable to be smaller. It is well known for improving the σs to compound spinel ferrite to magnetoplumbite ferrite or select the kind and amount added of the elements contained. Also, W-type hexagonal ferrite can be used.

At the time of dispersing magnetic powder, the surface of the magnetic particle is sometimes treated with a substance selected according to the dispersant and polymer. An inorganic compound or an organic compound is used as the surface treating material. Representative examples of predominantly employed compounds include compounds such as Si, Al and P, various silane coupling agents and various titanium coupling agents. The amount of the surface treating material is from 0.1 to 10% based on the magnetic powder. The pH of the magnetic powder also plays an important role in the dispersion. The pH is usually on the order of 4 to 12 and although the optimal value varies depending on the dispersant and polymer, a pH of approximately from 6 to 11 is selected in view of chemical stability and storability of the medium. The water content contained in the magnetic powder also affects the dispersion. Although the optimal value varies depending on the dispersant and polymer, a value of 0.01 to 2.0% is usually selected.

Examples of the production method for ferromagnetic hexagonal ferrite powder include the followings:

(1) a glass crystallization method where a metal oxide for substituting barium oxide•iron oxide•iron, and boron oxide or the like as the glass-forming substance are mixed to have a desired ferrite composition, the mixture is melted and quenched to form an amorphous body, and the amorphous body is again heat-treated and then washed/grained to obtain barium ferrite crystal powder;

(2) a hydrothermal reaction method where a metal salt solution of a barium ferrite composition is neutralized with an alkali and after removing by-products, the liquid phase is heated at 100° C. or more, then washed, dried and grained to obtain barium ferrite crystal powder; and (3) a co-precipitation method where a metal salt solution of a barium ferrite composition is neutralized with an alkali and after removing by-products, dried, treated at 1,100° C. or less and grained to obtain barium ferrite crystal powder.

In the present invention, ferromagnetic hexagonal barium ferrite powder is particularly preferred.

III. Nonmagnetic Powder

The nonmagnetic powder contained in the lower layer provided between the support and the magnetic layer is described in detail.

The nonmagnetic powder which can be used in the lower layer may be either an inorganic substance or an organic substance. Also, carbon black and the like may be used. Examples of the inorganic substance include metal, metal oxide, metal carbonate, metal sulfate, metal nitride, metal carbide and metal sulfide. Specific examples thereof include titanium oxide such as titanium dioxide, cerium oxide, tin oxide, tungsten oxide, ZnO, $ZrO_2$, $SiO_2$, $Cr_2O_3$, α-alumina having an α conversion of 90% to 100%, β-alumina, γ-alumina, α-iron oxide, goethite, corundum, silicon nitride, titanium carbide, magnetism oxide, boron nitride, molybdenum disulfide, copper oxide, $MgCO_3$, $CaCO_3$, $BaCO_3$, $SrCO_3$, $BaSO_4$, silicon carbide and titanium carbide. These are used individually or in combination of two or more thereof. Among these, α-iron oxide and titanium oxide are preferred.

The nonmagnetic powder may have any shape of acicular form, spherical form, polyhedral form and tabular form.

The crystallite size of the nonmagnetic powder is preferably from 0.004 to 1 μm, more preferably from 0.04 to 0.1 μm. If the crystallite size is less than 0.004 μm, the dispersion is liable to become difficult, whereas if it exceeds 1 μm, the surface roughness tends to large.

The average particle size of the nonmagnetic inorganic powder is preferably from 0.005 to 2 μm, however, if desired, a nonmagnetic powder having a different average particle size may be combined or even in the case of a single nonmagnetic powder, the same effect may be provided by broadening the grains size distribution. The average particle size is more preferably from 0.01 to 0.2 μm. If the average particle size is less than 0.005 μm, the dispersion is liable to become difficult, whereas if it exceeds 2 μm, the surface roughness tends to large.

The specific surface area of the nonmagnetic powder is usually from 1 to 100 m²/g, preferably from 5 to 70 m²/g, more preferably from 10 to 65 m²/g. If the specific surface area is less than 1 m²/g, the surface roughness tends to large, whereas if it exceeds 100 m²/g, the dispersion is liable to be difficult, for example, the dispersion cannot be performed with a predetermined amount of binder.

The oil absorption amount using dibutyl phthalate (DBP) is usually from 5 to 100 ml/100 g, preferably from 10 to 80 ml/100 g, more preferably from 20 to 60 ml/100 g. The specific gravity is usually from 1 to 12, preferably from 3 to 6.

The tap density is from 0.05 to 2 g/ml, preferably from 0.2 to 1.5 g/ml. If the tap density is less than 0.05 g/ml, flying of many particles occurs and the operation becomes difficult, whereas if it exceeds 2 g/ml, the powder easily adheres to the apparatus and the operation becomes difficult.

The pH of the nonmagnetic powder is preferably from 2 to 11, more preferably from 6 to 9. If the pH is less than 2, the coefficient of friction is liable to increase under the high-temperature and high-humidity conditions, whereas if the pH exceeds 11, the amount of fatty acid liberated decreases and the coefficient of friction tends to high.

The water content of the nonmagnetic metal powder is from 0.1 to 5% by weight, preferably from 0.2 to 3% by weight, more preferably from 0.3 to 1.5% by weight. If the water content exceeds 0.1% by weight, the dispersion may become difficult, whereas if it exceeds 5% by weight, the viscosity of the coating material may become unstable after the dispersion.

The ignition loss is preferably 20% by weight or less and a lower ignition loss is preferred.

In the case where the nonmagnetic powder is an inorganic powder, the Mohs' hardness is preferably from 4 to 10. If the Mohs' hardness is less than 4, the durability may not be ensured.

The stearic acid absorption amount of the nonmagnetic powder is from 1 to 20 $\mu$mol/m², preferably from 2 to 15 $\mu$mol/m².

The heat of wetting to water at 25° C. of the nonmagnetic inorganic powder is preferably from 200 to 600 erg/cm² (from 200 to 600 mJ/m²). Also, a solvent having a heat of wetting in this range may be used. The number of water molecules on the surface is suitably from 1 to 10 molecules per 100 Å at 100 to 400° C. The pH at the isoelectric point in water is preferably from 3 to 9.

The nonmagnetic powder is preferably surface-treated to allow $Al_2O_3$, $SiO_2$, $TiO_2$, $ZrO_2$, $SnO_2$, $Sb_2O_3$ or $ZnO$ to be present. Among these, $Al_2O_3$, $SiO_2$, $TiO_2$ and $ZrO_2$ are preferred in view of the dispersibility, and $Al_2O_3$, $SiO_2$ and $ZrO_2$ are more preferred. These surface treating agents may be used in combination or individually. According to the purpose, a surface-treating layer formed by coprecipitation may be used, or a method of allowing alumina to be present and then allowing silica to be present on the surface layer thereof or a method reversed thereto may also be employed. The surface-treating layer may be porous depending on the purpose, however, in general, the layer is preferably homogeneous and densified.

Specific examples of the nonmagnetic powder for use in the lower layer of the present invention include Nanotite (produced by Showa Denko K.K.), HIT-100, ZA-G1 (both produced by Sumitomo Chemical Co., Ltd.), DPN-250, DPN-250BX, DPN-245, DPN-270BX, DPB-550BX, DPN-550RX (all produced by Toda Kogyo Corp.), TTO-51B, TTO-55A, TTO-55B, TTO-55C, TTO-55S, TTO-55D, SN-100, MJ-7, α-iron oxide E270, E271, E300 (all produced by Ishihara Sangyo Kaisha Ltd.), STT-4D, STT-30D, STT-30, STT-65C (all produced by Titan Kogyo K.K.), MT-100S, MT-1000T, MT-150W, MT-500B, MT-600B, MT-100F, MT-500HD (all produced by Teika Co., Ltd.), FINEX-25, BF-1, BF-10, BF-20, ST-M (all produced by Sakai Chemical Industry Co., Ltd.), DEFIC-Y, DEFIC-R (both produced by Dowa Mining Co., Ltd.), AS2BM, TiO2P25 (both produced by Nippon Aerosil K.K.), 100A, 500A (both produced by Ube Industries, Ltd.), Y-LOP (produced by Titan Kogyo K.K.), and calcined products thereof. The nonmagnetic powder is particularly preferably titanium dioxide or α-iron oxide.

In the lower layer, carbon black may be mixed together with the nonmagnetic powder, whereby the surface electric resistance (Rs) and the light transmittance can be reduced and at the same time, a desired micro Vickers' hardness can be obtained.

The micro Vickers hardness of the lower layer is usually from 25 to 6 Kg/mm² (from 245 to 588 MPa) and for controlling the head touch, preferably from 30 to 50 Kg/mm² (from 294 to 490 MPa). The micro Vickers hardness can be determined by means of a thin film hardness meter (HMA-400, manufactured by NEC Corp.) using a diamond triangular pyramid needle having a sharpness of 80° and a tip radius of 0.1 $\mu$m as an indenter foot. According to the industrial standard for the light transmittance in general, the absorption of infrared ray having a wavelength of about 900 nm is 3% or less and in the case of VHS for example, 0.8% or less. In order to accord with this standard, furnace black for rubber, thermal black for rubber, black for color, acetylene black or the like may be used.

The carbon black for use in the lower layer of the present invention has a specific surface area of usually from 100 to 500 m²/g, preferably from 150 to 400 m²/g, and a DBP oil absorption of usually from 20 to 400 ml/100 g, preferably from 30 to 200 ml/100 g. The particle diameter of the carbon black is from 5 to 80 nm, preferably from 10 to 50 nm, more preferably from 10 to 40 nm. Furthermore, the carbon black preferably has a pH of 2 to 10, a water content of 0.1 to 10% and a tap density of 0.1 to 1 g/ml.

Specific examples of the carbon black for use in the present invention include BLACKPEARLES 2000, 1300, 1000, 900, 800, 880 and 700, VULCAN XC-72 (all produced by Cabot Co., Ltd.), #3050B, #3150B, #3250B, #3750B, #3950B, #950, #650B, #970B, #850B, MA-600 (all produced by Mitsubishi Kasei Corporation), CONDUCTEX SC, RAVEN 8800, 8000, 7000, 5750, 5250, 3500, 2100, 2000, 1800, 1500, 1255, 1250 (all produced by Columbia Carbon Co., Ltd.) and Ketjen Black EC (produced by Akzo Co., Ltd.). The carbon black may be used after it is surface-treated with a dispersant or grafted with a resin or after a part of the surface is graphitized. The carbon black may be previously dispersed in a binder before the addition to the coating solution. The carbon black can be used within the range of not exceeding 50% by weight based on the above-described inorganic powder (excluding carbon black) and not exceeding 40% of the total weight of the lower layer. These carbon blacks can be used individually or in combination. The carbon blacks which can be used in the present invention are described, for example, in Carbon Black Binran (Handbook of Carbon Blacks), compiled by Carbon Black Kyokai.

If desired, an organic powder may also be added to the lower layer according to the purpose. Examples thereof include acryl•styrene-based resin powder, benzoguanamine resin powder, melamine-based resin powder and phthalocyanine-based pigment. In addition, polyolefin-based resin powder, polyester-based resin powder, polyamide-based resin powder, polyimide-based resin powder and polyethylene fluoride resin may also be used.

The blending ratio of the acrylic resin and the polyurethane resin for the present invention are preferably such that, in terms of the weight ratio, the latter is from 5 to 2,000 parts per 100 parts of the former. The total of these two resins is preferably from 40 to 200 parts by weight per 100 parts by weight of the ferromagnetic powder or based on the nonmagnetic powder contained in the lower layer. In particular, when the content is set to the range of from 50 to 180 parts by weight, a phenomenon such as elevation in the glossiness of the magnetic layer or further on the nonmagnetic layer surface comes out and this reveals good dispersion state of the ferromagnetic powder or further of the nonmagnetic powder. Furthermore, by setting the content to the range from 70 to 160 parts by weight, the electromagnetic conversion characteristics are remarkably improved. If the content is less than 40 parts by weight, the ferromagnetic powder or further the nonmagnetic powder are not bonded and powder falling or the like is generated, and even if those resins are blended in excess of 200 parts by weight, the dispersion state of the ferromagnetic powder or further of the nonmagnetic powder is not improved any more and in the magnetic layer, the filling degree of the ferromagnetic powder decreases and the electromagnetic conversion characteristics may deteriorate.

IV. Other Additives

In the magnetic recording medium of the present invention, the magnetic layer or the lower layer may contain additives for imparting a dispersion effect, a lubricating effect, an antistatic effect, a plasticizing effect or the like. Examples of the additive which can be used include molybdenum disulfide; tungsten disulfide; graphite, boron nitride; fluorinated graphite; silicone oil; silicone having a polar group; fatty acid-modified silicone; fluorine-containing silicone; fluorine-containing alcohol; fluorine-containing ester; polyolefin; polyglycol; polyphenyl ether; benzene ring-containing organic phosphonic acids and alkali metal salts thereof, such as phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid and nonylphenylphosphonic acid; alkylphosphonic acids and alkali metal salts thereof, such as octylphosphonic acid, 2-ethylhexylphosphonic acid, (iso)octylphosphonic acid, (iso)nonylphosphonic acid, (iso)decylphosphonic acid, (iso)undecylphosphonic acid, (iso)dodecylphosphonic acid, (iso)hexadecylphosphonic acid, (iso)octadecylphosphonic acid and (iso)eicosylphosphonic acid; aromatic phosphoric acid esters and alkali metal salts thereof, such as phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, toluyl phosphate, xylyl phosphate, ethylphenyl phosphate, cumenyl phosphate, propylphenyl phosphate, butylphenyl phosphate, heptylphenyl phosphate, octylphenyl phosphate and nonylphenyl phosphate; phosphoric acid alkyl esters and alkali metal salts thereof, such as octyl phosphate, 2-ethylhexyl phosphate, isooctyl phosphate, (iso)nonyl phosphate, (iso)decyl phosphate, (iso)undecyl phosphate, (iso)dodecyl phosphate, (iso)hexadecyl phosphate, (iso) octadecyl phosphate and (iso)eicosyl phosphate; alkylsulfonic acid esters and alkali metal salts thereof; fluorine-containing alkyl sulfuric acid esters and alkali metal salts thereof; monobasic fatty acids having from 10 to 24 carbon atoms, which may contain an unsaturated bond or may be branched, and metal salts thereof, such as lauric acid, myristic acid, palmitic acid, stearic acid, behenic acid, butyl stearate, oleic acid, linoleic acid, linolenic acid, elaidic acid and erucic acid; and monofatty acid esters, difatty acid esters and polyfatty acid esters consisting of a monobasic fatty acid having from 10 to 24 carbon atoms, which may contain an unsaturated bond or may be branched, and any one of a mono- to hexa-hydric alcohol having from 2 to 22 carbon atoms, which may contain an unsaturated bond or may be branched, an alkoxy alcohol having from 12 to 22 carbon atoms, which may contain an unsaturated bond or may be branched, and a monoalkyl ether of an alkylene oxide polymer, such as butyl stearate, octyl stearate, amyl stearate, isooctyl stearate, octyl myristate, butyl laurate, butoxyethyl stearate, anhydrosorbitan monostearate, anhydrosorbitan distearate and anhydrosorbitan tristearate;

fatty acid amides having from 2 to 22 carbon atoms; and aliphatic amines having from 8 to 22 carbon atoms. Other than the above-described hydrocarbon groups, those having a nitro group and an alkyl, aryl or aralkyl group substituted by a group except for a hydrocarbon group, such as halogen-containing hydrocarbons (e.g., F, Cl, Br, $CF_3$, $CCl_3$, $CBr_3$) may also be used.

Furthermore, nonionic surfactants such as alkylene oxide type, glycerin type, glycidol type and alkylphenol ethylene oxide adduct; cationic surfactants such as cyclic amine, ester amide, quaternary ammonium salts, hydantoin derivative, heterocyclic compounds, phosphoniums and sulfoniums; anionic surfactants containing an acidic group such as carboxylic acid, sulfonic acid or sulfuric acid ester group; and amphoteric surfactants such as amino acids, aminosulfonic acids, sulfuric acid or phosphoric acid esters of aminoalcohol, and alkylbetaine type, may be used. These surfactants are described in detail in Kaimen Kasseizai Binran (Handbook of Surfactants), Sangyo Tosho K.K. These lubricant, antistatic agent and the like are not necessarily pure but may contain impurities other than the main component, such as isomer, unreacted material, by-product, decomposition product or oxide. The content of these impurities is preferably 30% by weight or less, more preferably 10% by weight or less.

Specific examples thereof include NAA-102, castor hardened fatty acid, NAA-42, Cation SA, Nymeen L-201, Nonion E-208, Anon BF, Anon LG (all produced by Nippon Oils And Fats Co., Ltd.), FAL-205, FAL-123 (both produced by Takemoto Yushi K.K.), Enujerubu LO (produced by Shin-nihon Rika K.K.), TA-3 (produced by Shin-Etsu Chemical Industry Co., Ltd.), Armide P (produced by Lion Ahmor), Duomin TDO (produced by Lion Fat and Oil Co., Ltd.), BA-41 G (produced by Nisshin Oil Mills, Ltd.), and Profan 2012E, New Pole PE61, Ionet MS-400 (all produced by Sanyo Kasei These dispersant, lubricant and surfactant for use in the present invention each may be properly differentiated in the kind and content between the nonmagnetic layer and the magnetic layer according to the purpose, if desired. For example, the dispersant has properties of adsorbing or bonding through a polar group and it is presumed that the dispersant mainly adsorbs or bonds to the ferromagnetic powder surface in the magnetic layer and mainly adsorbs or bonds through the above-described polar group onto the nonmagnetic powder surface in the lower layer and the dispersant once adsorbed does not desorb with ease from the surface of metal or metal compound. Accordingly, the ferromagnetic powder surface or nonmagnetic powder surface of the present invention is in the state covered with an alkyl group, an aromatic group or the like, whereby the affinity of the ferromagnetic powder or nonmagnetic powder for the resin components of the binder is elevated and the dispersion stability of the ferromagnetic powder or nonmagnetic powder is also improved. The lubricant is present in the liberated state and therefore, it may be considered to prevent the dissolving out (i.e., the elution) to the surface by using fatty acids different in the melting point between the lower layer and the magnetic layer or by using esters different in the boiling point or polarity, to improve the coating stability by controlling the surfactant content, or to improve the lubricating effect by adding the lubricant in a larger amount to the lower layer. The present invention is of course not limited to these examples. The additives for use in the present invention may be added entirely or partially at any step during the preparation of the coating solution for the magnetic layer or lower layer. For example, in the case of mixing with ferromagnetic powder before the kneading step, the additives may be added at the step of kneading ferromagnetic powder, binder and solvent, may be added at the dispersion step, may be added after the dispersion or may be added immediately before the coating.

V. Support

A coating solution prepared from the above-described materials is coated on a support to form the lower layer or the magnetic layer.

Examples of the support which can be used in the present invention include well-known materials such as biaxially stretched polyethylene terephthalate, polyethylene naphthalate, polyamide, polyimide, polyamide-imide, aromatic polyamide and polybenzoxydazole. Among these, preferred are polyethylene terephthalate, polyethylene naphthalate and aromatic polyamide. The support may be previously subjected to corona discharge treatment, plasma treatment, easy adhesion treatment, heat treatment or the like. The surface of the support which can be used in the present invention preferably has excellent smoothness such that the central plane average surface roughness by the Mirau method is from 0.1 to 20 nm, preferably from 1 to 10 mn, at a cut-off value of 0.25 mm. Furthermore, the support preferably has not only a small center-line average surface roughness but also has no coarse protrusion of 1 $\mu$m or more.

The support preferably has an arithmetic average roughness of, in terms of (Ra) value according to JIS B0660-1998, ISO 4287-1997, 0.1 $\mu$m or less because the obtained magnetic recording medium is reduced in noises.

In the magnetic recording medium of the present invention, the thickness of the support is preferably from 3 to 80 $\mu$m.

VI. Backcoat Layer, Undercoat Layer

On the surface of the support for use in the present invention in the side not having the magnetic layer, a backcoat layer (backing layer) may be provided. The backcoat layer is a layer provided by coating a backcoat layer-forming coating solution comprising an organic solvent having dispersed therein a binder and granular components such as abrasive and antistatic agent on the support surface where the magnetic layer is not provided. Various inorganic pigments and carbon black can be used as the granular component and resins such as nitrocellulose, phenoxy resin, vinyl chloride-based resin and polyurethane can be used as the binder, individually or in combination. In the present invention, an adhesive layer may be provided on the support surfaces coated with the magnetic coating solution and with the backcoat layer-forming coating solution.

In the magnetic recording medium of the present invention, an undercoat layer may also be provided. By providing an undercoat layer, the adhesive strength between the support and the magnetic layer or the lower layer can be enhanced. For the undercoat layer, a solvent-soluble polyester resin is used. The thickness of the undercoat layer is 0.5 $\mu$m or less.

VII. Production Method

The magnetic recording medium of the present invention is produced, for example, by coating a lower layer coating solution and a magnetic layer coating solution on the surface of a support under running each to a predetermined thickness. A plurality of magnetic layer coating solutions may be successively or simultaneously coated one on another or the lower layer coating solution and the magnetic layer coating solution may be successively or simultaneously one on another. For coating the magnetic layer coating solution or the lower layer coating solution, coating machines such as air doctor coater, blade coater, rod coater, extrusion coater, air knife coater, squeeze coater, impregnation coater, reverse roll coater, transfer roll coater, gravure coater, kiss coater, cast coater, spray coater and spin coater can be used. These are described, for example, in Saishin Coating Gijutsu (Latest Coating Technology), issued by Sogo Gijutsu Center (May 31, 1983).

In the case of applying to the magnetic recording medium of the present invention, examples of the apparatus and method for coating include the followings.

(1) The lower layer is first coated by a coating apparatus such as gravure, roll, blade, extrusion or the like which are commonly used for the coating of magnetic layer coating solution and while the lower layer is still in the non-dried state, the upper layer is coated by a support pressure-type extrusion coating apparatus disclosed in JP-B-1-46186 (the term "JP-B"as used herein means an "examined Japanese patent publication"), JP-A-60-238179 and JP-A-2-265672.

The upper and lower layers are almost simultaneously coated by one coating head having two slits for passing a coating solution disclosed in JP-A-63-88080, JP-A-2-17971 and JP-A-2-265672.

(3) The upper and lower layers are almost simultaneously coated by an extrusion coating apparatus with a back-up roll disclosed in JP-A-2-174965.

The thickness of the magnetic layer of the magnetic recording medium according to the present invention is optimized by the saturation magnetization amount of the head used, the head gap length and the recording signal band and is preferably from 0.01 to 0.5 $\mu$m. In the case of the magnetic layer containing ferromagnetic metal powder, the thickness of the magnetic layer is preferably from 0.01 to 0.1 $\mu$m and in the case of the magnetic layer containing ferromagnetic hexagonal ferrite powder, the thickness of the magnetic layer is preferably from 0.01 to 0.2 $\mu$m. The magnetic layer can be separated into two or more layers different in the magnetic characteristics and well-known constructions for multilayer-type magnetic layer can be applied. When a plurality of magnetic layer are provided, the thickness of the magnetic layer means the thickness of individual magnetic layers.

For stably coating this ultra-thin magnetic layer, it is preferred to interpose a lower layer containing inorganic powder on the support and coat the magnetic layer thereon by the wet-on-wet method.

In the case of magnetic tape, the coated layer of the magnetic layer coating solution is subjected to a treatment of applying longitudinal magnetic orientation to the ferromagnetic powder contained in the coated layer using a cobalt magnet or a solenoid. In the case of disk, a sufficiently isotropic orienting property may be obtained without performing orientation using an orientation apparatus, however, a well-known random orientation apparatus is preferably used, where cobalt magnets are diagonally and alternately disposed or an ac magnetic field is applied by a solenoid. As for the isotropic orientation, in the case of ferromagnetic metal fine powder, in-plane two dimensional random orientation is generally preferred but three dimensional random orientation may also be provided by incorporating a vertical component. In the case of ferromagnetic hexagonal ferrite powder, three dimensional random orientation of in-plane and in the vertical direction is readily imparted in general, however, in-plane two dimensional random orientation can also be imparted. Furthermore, vertical orientation may be imparted using a well-known method such as different pole and counter position magnet to have isotropic magnetic characteristics in the circumferential direction. In particular, when high density recording is performed, vertical orientation is preferred. Also, circumferential orientation may be imparted using spin coating.

The drying position of the coating can be preferably controlled by controlling the temperature and amount of drying air and the coating rate. Coating rate is preferably from 20 to 1,000 m/min and the temperature of drying air is preferably 60° C. or more. Furthermore, preliminary drying may also be appropriately performed before entering the magnet zone.

After the drying, the coated layer is subjected to a surface smoothing treatment. In the surface smoothing treatment, for example, a supercalender roll is used. By performing the surface smoothing treatment, the holes generated as a result of removal of the solvent at the drying disappear and the filling ratio of magnetic powder in the magnetic layer is elevated, so that the obtained magnetic recording medium can have high electromagnetic characteristics. For the calendering roll, a heat-resistant plastic roll such as epoxy, polyimide, polyamide and polyamido-imide can be used. Also, this treatment can be performed using a metal roll. The surface of the magnetic recording medium of the present invention preferably has extremely excellent smoothness such that the center line average surface roughness is from 0.1 to 4 nm, preferably from 1 to 3 mn, at a cut-off value of 0.25 mm. This is attained by a method where a magnetic layer is formed from a specific ferromagnetic powder and a specific binder as described above and subjected to the calendering treatment. The calendering treatment conditions are such that the calender roll temperature is from 60 to 100° C., preferably from 70 to 100° C., more preferably from 80 to 100° C., and the pressure is from 100 to 500 Kg/cm (from 98 to 490 kN/m), preferably from 200 to 450 Kg/cm (from 196 to 441 kN/m), more preferably from 300 to 400 Kg/cm (from 294 to 392 kN/m). The obtained magnetic recording medium is cut into a desired size using a cutter or the like and then used.

EXAMPLES

The present invention is described in greater detail below by referring to Examples, however, the present invention should not be construed as being limited thereto. Unless otherwise indicated, the "parts" in the Examples is "parts by weight".

Synthesis Example 1

Synthesis of Acrylic Resin A

Into a polymerization vessel equipped with a stirrer, a condenser, a thermometer and a nitrogen gas inlet, 360 parts of deionized water, 5 parts of potassium persulfate as an initiator and 1.6 parts of sodium carbonate were charged. After nitrogen purging, the temperature was elevated to 57° C. Separately, 390 parts of deionized water, 350 parts of methyl methacrylate, 120 parts of benzyl methacrylate, 20 parts of N-vinylpyrrolidone, 10 parts of 2-hydroxymethyl methacrylate and 10 parts of sodium laurylsulfate were previously mixed and emulsified in a homomixer. The obtained mixture was uniformly added dropwise to the above-described polymerization vessel over 8 hours and reacted at 57° C. for 2 hours, thereby completing the polymerization. Thereafter, 500 parts of methanol and 50 parts of sodium sulfate were added to precipitate a polymer. The precipitated polymer was washed twice with 5,000 parts of methanol and subsequently four times with 5,000 parts of deionized water, then filtered and dried to obtain Acrylic Resin A.

The sodium sulfonate group content was $6.2 \times 10^{-5}$ eq/g and the hydroxyl group content was $12.9 \times 10^{-5}$ eq/g.

Synthesis Examples 2 to 16

Synthesis of Acrylic Resins B to S and Comparative Resins g to j

Acrylic Resins B to S and Comparative Resins g to j were obtained in the same manner as in Synthesis Example 1 except that the copolymerization was performed by changing the kind and the amount ratio (% by weight) of monomers as shown in Tables 1 and 2.

Synthesis Example 17

Synthesis of Acrylic Resin T

Into a polymerization vessel equipped with a stirrer, a condenser, a thermometer and a nitrogen gas inlet, 360 parts of deionized water, 2 parts of t-butyl hydroperoxide and 1 part of sodium sulfite for the introduction of a hydrophilic polar group were charged. After nitrogen purging, the temperature was elevated to 57° C. Separately, 390 parts of deionized water, 315 parts of methyl methacrylate, 125 parts of benzyl methacrylate, 40 parts of N-vinylpyrrolidone, 10 parts of hydroxyethyl methacrylate, 10 parts of allyl glycidyl ether and 10 parts of sodium laurylsulfate were previously mixed and emulsified in a homomixer. The obtained mixture was uniformly added dropwise to the above-described polymerization vessel over 8 hours and reacted at 57° C. for 2 hours, thereby completing the polymerization. Thereafter, 50 parts of sodium sulfite, 25 parts of tetrabutylammonium bromide and 50 parts of ethylene glycol dimethyl ether were added dropwise and reacted at 70° C. for 6 hours while stirring. After the completion of reaction, the reaction product was washed four times with 5,000 parts of deionized water, then filtered and dried to obtain (meth)acrylate-base Copolymer T.

The sodium sulfonate group content was $7.6 \times 10^{-5}$ eq/g and the hydroxyl group content was $12.7 \times 10^{-5}$ eq/g.

Synthesis Example 18

Synthesis of Acrylic Resin U

Into a polymerization vessel equipped with a stirrer, a condenser, a thermometer and a nitrogen gas inlet, 360 parts of deionized water, 5 parts of potassium persulfate and 1.6 parts of sodium carbonate were charged. After nitrogen purging, the temperature was elevated to 57° C. Separately, 390 parts of deionized water, 320 parts of methyl methacrylate, 125 parts of benzyl methacrylate, 40 parts of N-vinylpyrrolidone, 10 parts of 2-hydroxyethyl methacrylate, 5 parts of vinylsulfonic acid and 10 parts of sodium laurylsulfate were previously mixed and emulsified in a homomixer. The obtained mixture was uniformly added dropwise to the above-described polymerization vessel over 8 hours and reacted at 57° C. for 2 hours, thereby completing the polymerization. Thereafter, 500 parts of methanol and 50 parts of sodium sulfate were added to precipitate a polymer. The precipitated polymer was washed twice with 5,000 parts of methanol and subsequently four times with 5,000 parts of deionized water, then filtered and dried to obtain (meth) acrylate-based Copolymer U.

The sodium sulfonate group content was $6.4 \times 10^{-5}$ eq/g and the hydroxyl group content was $12.7 \times 10^{-5}$ eq/g.

TABLE 1

| Composition of Monomer Unit (weight %) | | Synthesis Example No. | | | | | | | | | |
|---|---|---|---|---|---|---|---|---|---|---|---|
| | | 1 | 2 | 3 | 4 | 5 | 6 | 7 | 8 | 9 | 10 |
| | | A | B | C | D | E | F | g Comparison | h Comparison | i Comparison | j Comparison |
| (Meth) acrylate unit having benzene ring | Benzyl methacrylate | 24 | 20 | 30 | 40 | 25 | 10 | 50 | 0 | 10 | 18 |
| | Benzyl acrylate | | | | | | | | | | |
| | Phenoxy ethyl methacrylate | | | | | | | | | | |
| Radical polymerizable momoner unit containing nitrogen | N-Vinylpyrrolidone | 4 | 8 | 8 | 8 | 23 | 38 | 8 | 23 | 53 | 0 |
| | 2-Vinylpyridine | | | | | | | | | | |
| | Diethylaminoethyl methacrylate | | | | | | | | | | |
| | N-Methylol acrylamide | | | | | | | | | | |
| Other radical polymerizable monomer unit | Methyl methacrylate | 70 | 70 | 60 | 50 | 50 | 50 | 40 | 75 | 35 | 80 |
| | Butyl methacrylate | | | | | | | | | | |
| | 2-Hydroxymethyl methacrylate | 2 | 2 | 2 | 2 | 2 | 2 | 2 | 2 | 2 | 2 |
| | Vinylsulfonic acid | | | | | | | | | | |
| | Allyl glycidyl ether | | | | | | | | | | |
| Hydrophilic polar group | Introduction Method of —SO₃Na | initiator | → | → | → | → | → | → | → | → | → |
| | Amount of —SO₃Na (×10⁻⁵ eg/g) | 6.2 | 6.3 | 5.9 | 5.8 | 6.1 | 6.6 | 5.3 | 7.2 | 6.5 | 6.5 |
| | Introduction Method of —OH | copolymerization | → | → | → | → | → | → | → | → | → |
| | Amount of –OH (×10⁻⁵ eg/g) | 12.9 | 13.2 | 12.4 | 11.6 | 12.6 | 13.7 | 11.0 | 14.9 | 13.5 | 13.4 |

TABLE 2

| Composition of Monomer Unit (weight %) | | Synthesis Example No. | | | | | | | |
|---|---|---|---|---|---|---|---|---|---|
| | | 11 | 12 | 13 | 14 | 15 | 16 | 17 | 18 |
| | | M | O | P | Q | R | S | T | U |
| (Meth) acrylate unit having benzene ring | Benzyl methacrylate | 25 | | | 25 | 25 | 25 | 25 | 25 |
| | Benzyl acrylate | | 25 | | | | | | |
| | Phenoxy ethyl methacrylate | | | 25 | | | | | |
| Radical polymerizable monomer unit containing nitrogen | N-Vinylpyrrolidone | 8 | 8 | 8 | | | | 8 | 8 |
| | 2-Vinylpyridine | | | | 8 | | | | |
| | Diethylaminoethyl methacrylate | | | | | 8 | | | |
| | N-Methylol acrylamide | | | | | | 4 | | |
| Other radical polymerizable monomer unit | Methyl methacrylate | | 65 | 65 | 65 | 65 | 71 | 63 | 64 |
| | Butyl methacrylate | 65 | | | | | | | |
| | 2-Hydroxymethyl methacrylate | 2 | 2 | 2 | 2 | 2 | | 2 | 2 |
| | Vinylsulfonic acid | | | | | | | | 1 |
| | Allyl glycidyl ether | | | | | | 2 | | |
| Hydrophilic polar group | Introduction Method of —SO₃Na | initiator | → | → | → | → | → | after-reaction | copolymerization + initiator |
| | Amount of —SO₃Na (×10⁻⁵ eg/g) | 5.0 | 6.3 | 5.8 | 6.2 | 5.8 | 6.2 | 7.6 | 6.4 |
| | Introduction Method | copolymer- | → | → | → | → | → | → | → |

TABLE 2-continued

| | Synthesis Example No. | | | | | | | |
|---|---|---|---|---|---|---|---|---|
| | 11 | 12 | 13 | 14 | 15 | 16 | 17 | 18 |
| | Kind of Resin | | | | | | | |
| Composition of Monomer Unit (weight %) | M | O | P | Q | R | S | T | U |
| of —OH | ization | | | | | | | |
| Amount of —OH ($\times 10^{-5}$ eg/g) | 10.4 | 13.1 | 12.0 | 12.8 | 12.1 | 33.2 | 12.7 | 12.7 |

In Tables, "→" means "same as left".

Example 1

Preparation of Magnetic Layer Coating Solution:

| | |
|---|---|
| Ferromagnetic Acicular Metal Powder | 100 parts |
| Composition: Fe/Co/Al/Y = 68/20/7/5 (atomic ratio) | |
| Surface-treating layer: $Al_2O_3$, $Y_2O_3$ | |
| Hc: 2,500 Oe (200 kA/m) | |
| Crystallite size: 140 Å | |
| Average long axis length: 0.08 μm, | |
| Average acicular ratio: 6 | |
| BET Specific surface area: 46 m$^2$/g | |
| σs: 150 A · m$^2$/kg | |
| Polyurethane resin | 18 parts |
| (UR8200, produced by Toyo Boseki, sulfonic acid group-containing polyurethane resin) | |
| Phenylphosphonic acid | 3 parts |
| α-$Al_2O_3$ (average particle size: 0.15 μm) | 2 parts |
| Carbon black (average particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |
| Preparation of Lower Layer Coating Solution: | |
| Nonmagnetic inorganic powder: α-iron oxide | 85 parts |
| Surface-treating layer: $Al_2O_3$, $SiO_2$ | |
| Average long axis length: 0.15 μm | |
| Tap density: 0.8 | |
| Average acicular ratio: 7 | |
| BET Specific surface area: 52 m$^2$/g | |
| pH: 8 | |
| DBP Oil absorption: 33 ml/100 g | |
| Carbon Black | 20 parts |
| DBP Oil absorption: 120 ml/100 g | |
| pH: 8 | |
| BET Specific surface area: 250 m$^2$/g | |
| Volatile component: 1.5% | |
| Acrylic Resin A | 12 parts |
| Polyurethane resin | 6 parts |
| (UR8200, produced by Toyo Boseki, sulfonic acid-containing polyurethane resin) | |
| Phenylphosphonic acid | 3 parts |
| α-$Al_2O_3$ (average particle size: 0.2 μm) | 1 part |
| Cyclohexanone | 140 parts |
| Methyl ethyl ketone | 170 parts |
| Butyl stearate | 2 parts |
| Stearic acid | 1 part |

Respective components in each composition for the magnetic layer coating solution and for the lower layer coating solution were kneaded in an open kneader for 60 minutes and then dispersed using a sand mill for 120 minutes. To the obtained dispersion solution, 6 parts of a trifunctional low molecular weight polyisocyanate compound (Coronate 3041, produced by Nippon Polyurethane Co., Ltd.) was added and mixed while stirring for 20 minutes. The resulting solution was filtered through a filter having an average pore size of 1 μm to prepare a magnetic layer coating solution and a lower layer coating solution.

On a 6-μm thick polyethylene naphthalate support having a central plane average surface roughness of 5 nm, the lower layer coating solution was coated to a dry thickness of 1.8 μm and immediately thereafter, the magnetic layer coating solution was coated to a dry thickness of 0.08 μm, thereby completing simultaneous multi-layer coating. These two layers still in the wet state were subjected to magnetic orientation using a magnet of 300 mT and after drying, the coated layers were subjected to a surface smoothing treatment through a 7-stage calender consisting only of metal rolls at a velocity of 100 m/min, a line pressure of 300 Kg/cm (294 kN/m) and a temperature of 90° C. and then to a heat curing treatment at 70° C. for 24 hours. The obtained web was slit into 3.8 mm width to prepare a magnetic tape.

Examples 2 to 14

Magnetic tapes of Examples 2 to 14 were prepared in the same manner as in Example 1 except for changing Acrylic Resin A in the lower layer coating solution as shown in Table 3 in Example 1.

Comparative Examples 1 to 4

Magnetic tapes of Comparative Examples 1 to 4 were prepared in the same manner as in Example 1 except for changing Acrylic Resin A in the lower layer coating solution as shown in Table 3 in Example 1.

Example 15

A floppy disk of Example 15 was prepared by changing the magnetic powder as shown below.

Preparation of Magnetic Layer Coating Solution:

| | |
|---|---|
| Ferromagnetic Tabular Hexagonal Ferrite Powder | 100 parts |
| Composition (by mol): Ba/Fe/Co/Zn = 1/9.1/0.2/0.8 | |
| Hc: 2,450 Oe (195 kA/m) | |
| Average tabular diameter: 26 nm | |
| Average tabular ratio: 4 | |
| BET Specific surface area: 50 m$^2$/g | |
| σs: 60 A · m$^2$/kg | |
| Polyurethane resin | 18 parts |
| (UR8200, produced by Toyo Boseki, sulfonic acid group-containing polyurethane resin) | |
| Phenylphosphonic acid | 3 parts |
| α-$Al_2O_3$ (average particle size: 0.15 μm) | 2 parts |
| Carbon black (average particle size: 20 nm) | 2 parts |
| Cyclohexanone | 110 parts |

-continued

Preparation of Magnetic Layer Coating Solution:

| | |
|---|---|
| Methyl ethyl ketone | 100 parts |
| Toluene | 100 parts |
| Butyl stearate | 2 parts |
| Stearic acid | 1 part |

Using respective components shown above for the magnetic layer coating solution, a magnetic coating solution was prepared in the same manner as in Example 1.

On a 62-$\mu$m thick polyethylene naphthalate support having a central plane average surface roughness of 5 nm, the same lower layer coating solution as in Example 1 was coated to a dry thickness of 1.5 $\mu$m and immediately thereafter, the magnetic layer coating solution shown above was coated to a dry thickness of 0.12 $\mu$m, thereby completing simultaneous multi-layer coating. These two layers still in the wet state were subjected to a random orientation treatment by passing through an alternating current magnetic field generator having two magnetic field intensities, that is, magnetic field intensity of 25 mT with frequency of 50 Hz and magnetic field intensity of 12 mT with frequency of 50 Hz, and after drying, to a treatment through a 7-stage calender at a temperature of 90° C. and a line pressure of 300 Kg/cm (294 kN/m). The obtained web was punched to a disc of 3.7 inches, the disc was subjected to a surface polishing treatment and encased in a 3.7-inch zip-disk cartridge having a liner inside, and the cartridge was equipped with prescribed mechanism parts to obtain a 3.7-inch floppy disc.

Examples 16 to 20 and Comparative Example 5

Floppy disks of Examples 16 to 20 and Comparative Example 5 were prepared in the same manner as in Example 15 except for changing Acrylic Resin A in the lower layer coating solution as shown in Table 3 in Example 15.

The obtained samples were evaluated as follows and the results are shown in Tables 3 and 4.

Measuring Method

Magnetic Property (Hc)

Hc was measured at Hm of 10 kOe using a vibrating sample magnetometer (manufactured by Toei Kogyo K.K.).

Thickness of Magnetic Layer

The magnetic recording medium was cut out in the longitudinal direction by a diamond cutter to a thickness of about 0.1 $\mu$m, observed through a transmission type electron microscope at a magnification of 10,000 to 100,000, preferably from 20,000 to 50,000, and photographed. The print size of the photograph was from A4 to A5. By taking notice of the difference in the shape between the ferromagnetic powder and the nonmagnetic powder on the magnetic layer surface and in the magnetic layer and the lower layer, the interface therebetween was judged with an eye and contoured in black. Thereafter, the contoured lines were measured on the length by image processing apparatus IBAS2 (manufactured by Zeiss Corp.). When the length of the sample photograph was 21 cm, the measurement was performed from 85 to 300 times. The average measured value here was taken as the thickness of the magnetic layer.

Error Rate (Initial, After Storage)

In the case of a tape medium, signals were recorded on the tape by 8–10 conversion PR1 equalization system at 23° C. and 50% RH and the error rate was measured using a DDS drive. In the case of a disk medium, the signals were recorded on the disc by (2,7) RLL modulation system and the error rate was measured. Also, after the storage for 1 week at 50° C. and 80% RH, the error rate was measured in the same manner.

TABLE 3

| | Magnetic Powder | | | | | | | | | Error Rate | |
|---|---|---|---|---|---|---|---|---|---|---|---|
| | Average Long Axis Length $\mu$m | Crystallite Size Å | Composition of Magnetic Powder | | | Characteristics of Magnetic Powder | | | Thickness of Magnetic Layer $\mu$m | Resin Used in Lower Layer | Initial ×10$^{-5}$ | After Storage ×10$^{-5}$ |
| | | | Co | Al | Y | Hc kA/m | σs A·m$^2$kg | S$_{BET}$ m$^2$/g | | | | |
| | | | atom % | | | | | | | | | |
| Example 1 | 0.08 | 140 | 20 | 7 | 5 | 200 | 150 | 46 | 0.08 | A | 0.05 | 0.06 |
| Example 2 | 0.08 | 140 | 20 | 7 | 5 | 200 | 150 | 46 | 0.08 | B | 0.03 | 0.05 |
| Example 3 | 0.08 | 140 | 20 | 7 | 5 | 200 | 150 | 46 | 0.08 | C | 0.03 | 0.03 |
| Example 4 | 0.08 | 140 | 20 | 7 | 5 | 200 | 150 | 46 | 0.08 | D | 0.04 | 0.06 |
| Example 5 | 0.08 | 140 | 20 | 7 | 5 | 200 | 150 | 46 | 0.08 | E | 0.05 | 0.07 |
| Example 6 | 0.08 | 140 | 20 | 7 | 5 | 200 | 150 | 46 | 0.08 | F | 0.07 | 0.08 |
| Example 7 | 0.08 | 140 | 20 | 7 | 5 | 200 | 150 | 46 | 0.08 | M | 0.04 | 0.05 |
| Example 8 | 0.08 | 140 | 20 | 7 | 5 | 200 | 150 | 46 | 0.08 | O | 0.04 | 0.05 |
| Example 9 | 0.08 | 140 | 20 | 7 | 5 | 200 | 150 | 46 | 0.08 | P | 0.03 | 0.06 |
| Example 10 | 0.08 | 140 | 20 | 7 | 5 | 200 | 150 | 46 | 0.08 | Q | 0.04 | 0.06 |
| Example 11 | 0.08 | 140 | 20 | 7 | 5 | 200 | 150 | 46 | 0.08 | R | 0.06 | 0.07 |
| Example 12 | 0.08 | 140 | 20 | 7 | 5 | 200 | 150 | 46 | 0.08 | S | 0.06 | 0.08 |
| Example 13 | 0.08 | 140 | 20 | 7 | 5 | 200 | 150 | 46 | 0.08 | T | 0.04 | 0.07 |
| Example 14 | 0.08 | 140 | 20 | 7 | 5 | 200 | 150 | 46 | 0.08 | U | 0.05 | 0.08 |
| Comparative Example 1 | 0.08 | 140 | 20 | 7 | 5 | 200 | 150 | 46 | 0.08 | i | 0.21 | 0.24 |
| Comparative Example 2 | 0.08 | 140 | 20 | 7 | 5 | 200 | 150 | 46 | 0.08 | j | 0.60 | 0.63 |

TABLE 4

| | Average | Magnetic Powder Composition | | | Characteristics | | | Thickness of Magnetic Layer µm | Resin Used in Lower Layer | Error Rate | |
|---|---|---|---|---|---|---|---|---|---|---|---|
| | Tabular | Fe | Co | Zn | Hc | σs | S$_{BET}$ | | | | After |
| | diameter Nm | Molar Ratio (Ba = 1) | | | kA/m | A·m²kg | m²/g | | | Initial ×10$^{-5}$ | Storage ×10$^{-5}$ |
| Example 15 | 26 | 9.1 | 0.2 | 0.8 | 196 | 60 | 50 | 0.12 | A | 0.45 | 0.62 |
| Example 16 | 26 | 9.1 | 0.2 | 0.8 | 196 | 60 | 50 | 0.12 | B | 0.32 | 0.47 |
| Example 17 | 26 | 9.1 | 0.2 | 0.8 | 196 | 60 | 50 | 0.12 | C | 0.36 | 0.46 |
| Example 18 | 26 | 9.1 | 0.2 | 0.8 | 196 | 60 | 50 | 0.12 | D | 0.48 | 0.70 |
| Example 19 | 26 | 9.1 | 0.2 | 0.8 | 196 | 60 | 50 | 0.12 | E | 0.59 | 0.84 |
| Example 20 | 26 | 9.1 | 0.2 | 0.8 | 196 | 60 | 50 | 0.12 | F | 0.67 | 0.92 |
| Comparative Example 5 | 26 | 9.1 | 0.2 | 0.8 | 196 | 60 | 50 | 0.12 | g | 4.08 | 4.30 |

As apparent from Tables 3 and 4, the magnetic recording mediums according to the first embodiment of the invention stably exhibit a low error rate.

The magnetic recording medium according to the second embodiment of the invention is described below by referring to Examples.

Synthesis Example AC-1

Synthesis of Acrylic Resin AC-1

Into a polymerization vessel equipped with a stirrer, a condenser, a thermometer and a nitrogen gas inlet, 360 parts of deionized water, 5 parts of potassium persulfate and 1.6 parts of sodium carbonate were charged. After nitrogen purging, the temperature was elevated to 57° C. Separately, 390 parts of deionized water, 350 parts of methyl methacrylate, 120 parts of benzyl methacrylate, 20 parts of N-vinylpyrrolidone, 10 parts of 2-hydroxymethyl methacrylate and 10 parts of sodium laurylsulfate were previously mixed and emulsified in a homomixer. The obtained mixture was uniformly added dropwise to the above-described polymerization vessel over 8 hours and reacted at 57° C. for 2 hours, thereby completing the polymerization. Thereafter, 500 parts of methanol and 50 parts of sodium sulfate were added to precipitate a polymer. The precipitated polymer was washed twice with 5,000 parts of methanol and subsequently four times with 5,000 parts of deionized water, then filtered and dried to obtain Acrylic Resin AC-1.

The sodium sulfonate group content was $6.2 \times 10^{-5}$ eq/g and the hydroxyl group content was $12.9 \times 10^{-5}$ eq/g.

Synthesis Examples AC-2 to AC-6 and ac-7 and ac-8 (Comparison)

Synthesis of Acrylic Resins AC-2 to AC-6 and ac-7 and ac-8 (Comparison)

Acrylic Resins AC-2 to AC-6 and ac-7 and ac-8 were obtained in the same manner as in Synthesis Example AC-1 except that the copolymerization was performed by changing the kind and the amount ratio (% by weight) of monomers as shown in Table 5.

Synthesis Example AC-9

Synthesis of Acryl Copolymer AC-9

Into a polymerization vessel equipped with a stirrer, a condenser, a thermometer and a nitrogen gas inlet, 500 parts of cyclohexanone was charged. After nitrogen purging, the temperature was elevated to 80° C. Thereinto, 320 parts of methyl acrylate, 125 parts of benzyl methacrylate, 40 parts of N-vinylpyrrolidone, 10 parts of 2-hydroxymethyl methacrylate and 10 parts of acrylamido-2-methylpropanesulfonic acid were added and reacted at 57° C. for 8 hours, thereby completing the polymerization, to obtain Acrylic Resin AC-9.

TABLE 5

| Composition of Monomer Unit (Wt %) | | Synthesis Example No. | | | | | | | | |
|---|---|---|---|---|---|---|---|---|---|---|
| | | AC-1 | AC-2 | AC-3 | AC-4 | AC-5 | AC-6 | ac-7 | ac-8 | AC-9 |
| Alkyl (meth)-acrylate unit | Methyl methacrylate | 70 | 60 | 50 | 65 | 65 | 65 | 10 | 80 | 64 |
| Radical polymerizable monomer unit containing nitrogen | N-vinylpyrrolidone | 4 | 8 | 38 | 8 | | | 8 | 0 | 8 |
| | Diacetone acrylamide | | | | | 8 | | | | |
| | Dimethylaminoethyl methacrylate | | | | | | 8 | | | |
| (Meth) acrylate unit having aromatic ring | Benzyl methacrylate | 24 | 30 | 10 | | 25 | 25 | 80 | 18 | 25 |
| | Benzyl acrylate | | | | 25 | | | | | |
| Other radical polymerizable monomer unit | 2-Hydroxymethyl methacrylate | 2 | 2 | 2 | 2 | 2 | 2 | 2 | 2 | 2 |
| | Acrylamido-2-methyl-propanesulfonic acid | | | | | | | | | 2 |

TABLE 5-continued

| Composition of Monomer Unit (Wt %) | | Synthesis Example No. | | | | | | | | |
|---|---|---|---|---|---|---|---|---|---|---|
| | | AC-1 | AC-2 | AC-3 | AC-4 | AC-5 | AC-6 | ac-7 | ac-8 | AC-9 |
| Polar group | Introduction method of —$SO_3Na$ | initiator | → | → | → | → | → | → | → | copolymerization |
| | Amount of —$SO_3Na$ (×$10^{-5}$ eg/g) | 6.2 | 5.9 | 6.6 | 5.8 | 6.3 | 5.9 | 4.6 | 6.5 | 8.7 |
| | Introduction method of —OH | copolymerization | → | → | → | → | → | → | → | → |
| | Amount of —OH (×$10^{-5}$ eg/g) | 12.9 | 12.4 | 13.7 | 12.0 | 12.6 | 12.3 | 9.5 | 13.4 | 12.6 |

Synthesis Example PUA-1

Synthesis of Polyurethane Resin (A) PUA-1

A polyether polyol and a diol as a chain extending agent, each having the composition shown in Table 6, were dissolved in a cyclohexanone 30% solution at 60° C. under a nitrogen stream and charged into a polymerization vessel equipped with a thermometer, a stirrer and a reflux condenser and previously purged with nitrogen. Subsequently, 60 ppm of dibutyltin dilaurate was added and dissolved for 15 minutes. Furthermore, an organic diisocyanate shown in Table 6 was added and reacted under heating for 6 hours to obtain Polyurethane Resin (A) PUA-1.

Synthesis Examples PUA-2, PUA-3, PUa-4, PUC-1 and PUC-2

Synthesis of Polyurethane Resins (A) PUA-2, PUA-3, PUa-4 (Comparison) and Polyurethane Resins (c) PUC-1 and PUC-2

The titled polyurethane resins were obtained in the same manner as in Synthesis Example PUA-1 using a chain extending agent and an organic diisocyanate shown in Table 6.

Synthesis Example PUB-1
Synthesis of Polyurethane Resin (B) PUB-1
Synthesis of Polyester Polyol A Into a reactor equipped with a thermometer, a stirrer and a reflux condenser, 365 parts of adipic acid and 260 parts of neopentyl glycol were charged and as catalysts, 2% by weight of zinc acetate and 3% by weight of sodium acetate were charged. A transesterification reaction was performed at 180 to 220° C. for 3 hours and a polycondensation reaction was performed at 220 to 280° C. under reduced pressure of 1 to 10 mmHg for 2 hours. Thus, Polyester Polyol A was obtained.

Synthesis of Polyurethane Resin (B) PUB-1

Subsequently, Polyurethane Resin (B) PUB-1 was obtained in the same manner as in Synthesis Example PUA-1 except for using Polyester Polyol A obtained above and using a chain extending agent and an organic diisocyanate shown in Table 6.

Synthesis Examples PUb-2 to PUb-4
Synthesis of Polyurethane Resin PUb-2 to PUb-4 (Comparison)

The titled polyurethane resins were obtained in the same manner as in Synthesis Example PUB-1 except for using Polyester Polyol A, a chain extending agent and an organic diisocyanate shown in Table 6.

TABLE 6

| Polyurethane Synthesis Example | Polyol | | Chain Extending Agent | | DEIS Amount Added (parts) | Organic Diisocyanate | | Weight Average Molecular Weight |
|---|---|---|---|---|---|---|---|---|
| | Kind | Amount Added (parts) | Kind | Amount Added (parts) | | Kind | Amount Added (parts) | |
| PUA-1 | Polyether A | 40 | HBpA | 22 | 2.1 | MDI | 36.0 | 41000 |
| PUA-2 | ↓ | 40 | ↓ | 22 | 2.1 | ↓ | 36.0 | 38000 |
| PUA-3 | Polyether B | 24 | ↓ | 22 | 1.8 | ↓ | 36.0 | 38000 |
| PUa-4 | Polyether A | 40 | 1,6-hexanediol | 11 | 1.9 | ↓ | 36.0 | 42000 |
| PUB-1 | Polyester A | 45 | 2-ethyl-2-butyl-1,3-propanediol | 9.5 | 1.6 | ↓ | 21.0 | 41000 |
| PUb-2 | Polyester b | 47.5 | ↓ | 9.5 | 1.7 | ↓ | 21.0 | 42000 |
| PUb-3 | Polyester A | 45 | 1,6-hexanediol | 7 | 1.6 | ↓ | 21.0 | 39000 |
| PUb-4 | Polyester b | 47.5 | ↓ | 7 | 1.6 | ↓ | 21.0 | 42000 |
| PUC-1 | Dimer diol | 36.5 | HBpA | 21.5 | 2.3 | ↓ | 47.5 | 38000 |
| PUC-2 | ↓ | 15 | ↓ | 35 | 1.9 | ↓ | 40.0 | 38000 |

HBpA: hydrogenated bisphenol A
Polyether A: polypropylene oxide adduct of bisphenol A (molecular weight: 1,000)
Polyether B: polypropylene oxide adduct of bisphenol A (molecular weight: 600)
Polyester A: adipic acid/neopentyl glycol = 73/52 (molecular weight: 1,000)
Polyester b: adipic acid/1,6-hexanediol = 73/59 (molecular weight: 1,000)
DEIS: ethylene oxide adduct of sulfoisophthalic acid
MDI: 4,4'-diphenylmethane diisocyanate

Example 21

Preparation of Magnetic Layer Coating Solution:

| | |
|---|---|
| Ferromagnetic Acicular Metal Powder<br>Composition: Fe/Co/Al/Y = 68/20/7/5<br>Surface-treating layer: $Al_2O_3$, $Y_2O_3$<br>Hc: 2,500 Oe (200 kA/m)<br>Crystallite size: 14 nm<br>Average long axis length: 0.08 $\mu$m,<br>Average acicular ratio: 6<br>BET Specific surface area: 46 m$^2$/g<br>σs: 150 A · m$^2$/kg | 100 parts |
| Acrylic Resin AC-1 (shown in Table 5) | 6 parts |
| Polyurethane Resin (A) PUA-1<br>(shown in Table 6) | 12 parts |
| Phenylphosphonic acid | 3 parts |
| α-$Al_2O_3$ (average particle size: 0.15 $\mu$m) | 2 parts |
| Carbon black (average particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |
| Preparation of Lower Layer Coating Solution: | |
| Nonmagnetic inorganic powder: α-iron oxide<br>Surface-treating layer: $Al_2O_3$, $SiO_2$<br>Average long axis length: 0.15 $\mu$m<br>Tap density: 0.8<br>Average acicular ratio: 7<br>BET Specific surface area: 52 m$^2$/g<br>pH: 8<br>DBP Oil absorption: 33 ml/100 g | 85 parts |
| Carbon Black<br>DBP Oil absorption: 120 ml/100 g<br>pH: 8<br>BET Specific surface area: 250 m$^2$/g<br>Volatile component: 1.5% | 20 parts |
| Acrylic Resin AC-1 (shown in Table 5) | 6 parts |
| Polyurethane Resin (A) PUA-1<br>(shown in Table 6) | 12 parts |
| Phenylphosphonic acid | 3 parts |
| α-$Al_2O_3$ (average particle size: 0.2 $\mu$m) | 1 part |
| Cyclohexanone | 140 parts |
| Methyl ethyl ketone | 170 parts |
| Butyl stearate | 2 parts |
| Stearic acid | 1 part |

Respective components in each composition for the magnetic layer coating solution and for the lower layer coating solution were kneaded in an open kneader for 60 minutes and then dispersed using a sand mill for 120 minutes. To the obtained dispersion solution, 6 parts of a trifunctional low molecular weight polyisocyanate compound (Coronate 3041, produced by Nippon Polyurethane Co., Ltd.) was added and mixed while stirring for 20 minutes. The resulting solution was filtered through a filter having an average pore size of 1 $\mu$m to prepare a magnetic layer coating solution and a lower layer coating solution.

On a 6-$\mu$m thick polyethylene naphthalate support having a central plane average surface roughness of 5 nm, the lower layer coating solution was coated to a dry thickness of 1.8 $\mu$m and immediately thereafter, the magnetic layer coating solution was coated to a dry thickness of 0.08 $\mu$m, thereby completing simultaneous multi-layer coating. These two layers still in the wet state were subjected to magnetic orientation using a magnet of 300 mT and after drying, the coated layers were subjected to a surface smoothing treatment through a 7-stage calender consisting only of metal rolls at a velocity of 100 m/min, a line pressure of 300 Kg/cm (294 kN/m) and a temperature of 90° C. and then to a heat curing treatment at 70° C. for 24 hours. The obtained web was slit into 3.8 mm width to prepare a magnetic tape.

Examples 22 to 32

Magnetic tapes of Examples 22 to 32 were prepared in the same manner as in Example 21 except for changing the acrylic resin and the polyurethane resin as shown in Table 7.

Comparative Examples 6 to 13

Magnetic tapes of Comparative Examples 6 to 13 were prepared in the same manner as in Example 21 except for changing the acrylic resin and the polyurethane resin as shown in Table 7.

Example 33

A floppy disk of Example 35 was prepared by changing the magnetic powder as shown below.

Preparation of Magnetic Layer Coating Solution:

| | |
|---|---|
| Ferromagnetic Tabular Hexagonal Ferrite Powder<br>Composition (by mol): Ba/Fe/Co/Zn = 1/9.1/0.2/0.8<br>Hc: 2,450 Oe (195 kA/m)<br>Average tabular diameter: 26 nm<br>Average tabular ratio: 4<br>BET Specific surface area: 50 m$^2$/g<br>σs: 60 A · m$^2$/kg | 100 parts |
| Acrylic Resin AC-2 (shown in Table 5) | 6 parts |
| Polyurethane Resin (A) PUA-1<br>(shown in Table 6) | 12 parts |
| Phenylphosphonic acid | 3 parts |
| α-$Al_2O_3$ (average particle size: 0.15 $\mu$m) | 2 parts |
| Carbon black (average particle size: 20 m) | 2 parts |
| Cyclohexanone | 110 parts |
| Methyl ethyl ketone | 100 parts |
| Toluene | 100 parts |
| Butyl stearate | 2 parts |
| Stearic acid | 1 part |

Using respective components shown above for the magnetic layer coating solution, a magnetic coating solution was prepared in the same manner as in Example 21.

On a 62-$\mu$m thick polyethylene naphthalate support having a central plane average surface roughness of 5 nm, the same lower layer coating solution as in Example 21 was coated to a dry thickness of 1.5 $\mu$m and immediately thereafter, the magnetic layer coating solution shown above was coated to a dry thickness of 0.12 $\mu$m, thereby completing simultaneous multi-layer coating. These two layers still in the wet state were subjected to a random orientation treatment by passing through an alternating current magnetic field generator having two magnetic field intensities, that is, magnetic field intensity of 25 mT with frequency of 50 Hz and magnetic field intensity of 12 mT with frequency of 50 Hz, and after drying, to a treatment through a 7-stage calender at a temperature of 90° C. and a line pressure of 300 Kg/cm (294 kN/m). The obtained web was punched to a disc of 3.7 inches, the disc was subjected to a surface polishing treatment and encased in a 3.7-inch zip-disk cartridge having a liner inside, and the cartridge was equipped with prescribed mechanism parts to obtain a 3.7-inch floppy disc.

Examples 34 to 38

Floppy disks of Examples 34 to 38 were prepared in the same manner as in Example 33 except for changing the acrylic resin and the polyurethane resin as shown in Table 8.

Comparative Examples 14 and 15

Floppy disks of Comparative Examples 14 and 15 were prepared in the same manner as in Example 33 except for changing the acrylic resin and the polyurethane resin as shown in Table 8. In Table 8, MR110 and N-2304 are commercially available polar group-containing vinyl chloride-based resin (produced by Nippon Zeon) and polar group-containing polyurethane resin (produced by Nippon Polyurethane), respectively.

The obtained samples were evaluated as follows and the results are shown in Tables 7 and 8.

Measuring Method

Magnetic Property (Hc)

Hc was measured at Hm of 10 kOe (800 kA/m) using a vibrating sample magnetometer (manufactured by Toei Kogyo K.K.).

Thickness of Magnetic Layer:

The magnetic recording medium was cut out in the longitudinal direction by a diamond cutter to a thickness of about 0.1 μm, observed through a transmission type electron microscope at a magnification of 10,000 to 100,000, preferably from 20,000 to 50,000, and photographed. The print size of the photograph was from A4 (i.e., 210×297 mm) to A5 (i.e., 148×210 mm). By taking notice of the difference in the shape between the ferromagnetic powder and the non-magnetic powder on the magnetic layer surface and in the magnetic layer and the lower layer, the interface therebetween was judged with an eye and contoured in black. Thereafter, the contoured lines were measured on the length by image processing apparatus IBAS2 (manufactured by Zeiss Corp.). When the length of the sample photograph was 21 cm, the measurement was performed from 85 to 300 times. The average measured value here was taken as the thickness of the magnetic layer.

Error Rate (Initial, After Storage)

In the case of a tape medium, signals were recorded on the tape by 8–10 conversion PR1 equalization system at 23° C. and 50% RH and the error rate was measured using a DDS drive. In the case of a disk medium, the signals were recorded on the disc by (2,7) RLL modulation system and the error rate was measured. Also, after the storage for 1 week at 50° C. and 80% RH, the error rate was measured in the same manner.

TABLE 7

| | Binder | | | | Error Rate | |
| | Upper Layer | | Lower Layer | | | After |
| Sample | Acrylic Resin | Polyurethane Resin | Acrylic Resin | Polyurethane Resin | Initial ×10$^{-5}$ | Storage ×10$^{-5}$ |
|---|---|---|---|---|---|---|
| Example 21 | AC-1 | PUA-1 | AC-1 | PUA-1 | 0.04 | 0.05 |
| Example 22 | AC-2 | PUA-1 | AC-2 | PUA-1 | 0.03 | 0.10 |
| Example 23 | AC-2 | PUA-2 | AC-2 | PUA-2 | 0.02 | 0.03 |
| Example 24 | AC-2 | PUA-3 | AC-2 | PUA-3 | 0.03 | 0.06 |
| Example 25 | AC-2 | PUB-1 | AC-2 | PUB-1 | 0.05 | 0.14 |
| Example 26 | AC-2 | PUC-1 | AC-2 | PUC-1 | 0.06 | 0.11 |
| Example 27 | AC-2 | PUC-2 | AC-2 | PUC-2 | 0.04 | 0.13 |
| Example 28 | AC-3 | PUB-1 | AC-3 | PUB-1 | 0.03 | 0.05 |
| Example 29 | AC-4 | PUB-1 | AC-4 | PUB-1 | 0.03 | 0.06 |
| Example 30 | AC-5 | PUB-1 | AC-5 | PUB-1 | 0.04 | 0.12 |
| Example 31 | AC-6 | PUB-1 | AC-6 | PUB-1 | 0.05 | 0.06 |
| Example 32 | AC-9 | PUB-1 | AC-9 | PUB-1 | 0.06 | 0.08 |
| Comparative Example 6 | MR110 | PUB-1 | MR110 | PUB-1 | 0.50 | 1.41 |
| Comparative Example 7 | AC-2 | N-2304 | AC-2 | N-2304 | 3.50 | 3.70 |
| Comparative Example 8 | ac-7 | PUB-1 | ac-7 | PUB-1 | 0.60 | 0.68 |
| Comparative Example 9 | ac-8 | PUB-1 | ac-8 | PUB-1 | 0.90 | 1.07 |
| Comparative Example 10 | AC-2 | PUa-4 | AC-2 | PUa-4 | 0.40 | 0.42 |
| Comparative Example 11 | AC-2 | PUb-2 | AC-2 | Pub-2 | 0.50 | 0.61 |
| Comparative Example 12 | AC-2 | PUb-3 | AC-2 | PUb-3 | 0.40 | 0.44 |
| Comparative Example 13 | AC-2 | PUb-4 | AC-2 | Pub-4 | 0.60 | 0.64 |

TABLE 8

| | Binder | | | | Error Rate | |
| | Upper Layer | | Lower Layer | | | After |
| Sample | Acrylic Resin | Polyurethane Resin | Acrylic Resin | Polyurethane Resin | Initial ×10$^{-5}$ | Storage ×10$^{-5}$ |
|---|---|---|---|---|---|---|
| Example 33 | AC-2 | PUA-1 | AC-2 | PUA-1 | 0.40 | 0.42 |
| Example 34 | AC-2 | PUA-2 | AC-2 | PUA-2 | 0.30 | 0.30 |

TABLE 8-continued

| | Binder | | | | Error Rate | |
|---|---|---|---|---|---|---|
| | Upper Layer | | Lower Layer | | | After |
| Sample | Acrylic Resin | Polyurethane Resin | Acrylic Resin | Polyurethane Resin | Initial ×10$^{-5}$ | Storage ×10$^{-5}$ |
| Example 35 | AC-2 | PUA-3 | AC-2 | PUA-3 | 0.30 | 0.31 |
| Example 36 | AC-2 | PUB-1 | AC-2 | PUB-1 | 0.45 | 0.46 |
| Example 37 | AC-2 | PUC-1 | AC-2 | PUC-1 | 0.55 | 0.55 |
| Example 38 | AC-2 | PUC-2 | AC-2 | PUC-2 | 0.65 | 0.66 |
| Comparative Example 14 | MR110 | PUB-1 | MR110 | PUB-1 | 4.00 | 5.41 |
| Comparative Example 15 | AC-2 | N-2304 | AC-2 | N-2304 | 7.00 | 7.92 |

As apparent from Tables 7 and 8, the magnetic recording mediums according to the present invention stably exhibit a low error rate.

According to the present invention, a magnetic recording medium comprising a support having provided thereon a lower layer containing a nonmagnetic powder and a binder and further provided thereon at least one magnetic layer containing a ferromagnetic powder and a binder is provided, wherein the lower layer contains as a binder at least a monomer unit comprising from 5 to 45% by weight of a (meth)acrylate unit containing a benzene ring and from 1 to 45% by weight of a radical polymerizable monomer unit containing a nitrogen atom, with these units making a total amount of 100% by weight, and also contains an acrylic resin having a hydrophilic polar group; or a magnetic recording medium comprising a support having provided thereon at least one magnetic layer containing a ferromagnetic powder and a binder each in the dispersed state is provided, wherein the magnetic layer contains at least a monomer unit comprising from 15 to 75% by weight of an alkyl (meth)acrylate as a binder and from 1 to 45% by weight of a radical polymerizable monomer unit containing nitrogen, with these units making a total amount of 100% by weight, and an acrylic resin having a hydrophilic polar group is used in combination with (A) a polyurethane resin having a hydrophilic group, obtained by reacting a polyether polyol containing a cyclic structure and an alkylene oxide chain and having a molecular weight of 500 to 5,000, a polyol containing a cyclic structure as a chain extending agent and having a molecular weight of 200 to 500, and an organic diisocyanate; (B) a polyurethane resin having a hydrophilic polar group, obtained by reacting a polyester polyol comprising an aliphatic dibasic acid and an aliphatic diol not containing a cyclic structure having a branched alkyl side chain, an aliphatic diol containing a branched alkyl side chain having 3 or more carbon atoms as a chain extending agent, and an organic diisocyanate compound; or (C) a polyurethane resin having a hydrophilic polar group, obtained by reacting a polyol compound containing a cyclic structure and a long alkyl chain with an organic diisocyanate. By virtue of these constructions, a recording medium where the smoothness of coating is improved, the electromagnetic conversion characteristics are improved, the magnetic layer surface is scarcely scratched, the head contamination is reduced, the storability is greatly improved, the increase of error rate is reduced, the running durability is excellent, the surface smoothness of the obtained magnetic recording medium is excellent and a low error rate is ensured, can be provided. Therefore, the present invention is verified to have remarkable effects as compared with conventional techniques. Furthermore, the binder can be constructed without using a chlorine-based resin and therefore, the present invention can contribute to the environmental conservation.

The entitle disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support having provided thereon a lower layer containing a nonmagnetic powder and a binder and further provided thereon at least one magnetic layer containing a ferromagnetic powder and a binder, wherein said lower layer contains as a binder at least a monomer unit comprising from 5 to 45% by weight of a (meth)acrylate unit containing a benzene ring and from 1 to 45% by weight of a radical polymerizable monomer unit containing a nitrogen atom, with these units making a total amount of 100% by weight, and also contains an acrylic resin having a hydrophilic polar group.

2. The magnetic recording medium as claimed in claim 1, wherein said ferromagnetic powder is a ferromagnetic metal powder having an average long axis length of 0.01 to 0.10 μm and a crystallite size of 80 to 180 Å or a ferromagnetic hexagonal ferrite powder having an average sheet size of 5 to 40 nm.

3. The magnetic recording medium as claimed in claim 1, wherein the thickness of said magnetic layer is from 0.01 to 0.5 μm.

4. The magnetic recording medium as claimed in claim 1, wherein said ferromagnetic metal powder mainly comprises Fe and contains, based on Fe, from 10 to 40 atm % of Co, from 2 to 20 atm % of Al and from 1 to 15 atm % of Y; the coercive force is from 2,000 to 3,000 oersted (Oe) (160 to 240 kA/m) and the saturation magnetization (σs) is from 80 to 170 A·m$^2$/kg.

5. The magnetic recording medium as claimed in claim 1, wherein said ferromagnetic hexagonal ferrite powder is a hexagonal barium ferrite having a coercive force of 2,000 to 3,000 Oe (160 to 240 kA/m) and a saturation magnetization (σs) is from 40 to 80 A·m$^2$/kg.

6. The magnetic recording medium as claimed in claim 1, wherein said magnetic recording medium is a magnetic disc or tape for recording digital signals, which is applied to an MR reproduction head-mounted recording/reproducing system.

7. A magnetic recording medium comprising a support having provided thereon at least one magnetic layer containing a ferromagnetic powder and a binder each in the dispersed state, wherein the magnetic layer contains at least a monomer unit comprising from 15 to 75% by weight of an alkyl (meth)acrylate as a binder and from 1 to 45% by weight of a radical polymerizable monomer unit containing nitrogen, with these units making a total amount of 100% by weight, and an acrylic resin having a hydrophilic polar group is used in combination with (A) a polyurethane resin having a hydrophilic group, obtained by reacting a polyether polyol containing a cyclic structure and an alkylene oxide chain and having a molecular weight of 500 to 5,000, a polyol containing a cyclic structure as a chain extending agent and having a molecular weight of 200 to 500, and an organic diisocyanate; (B) a polyurethane resin having a hydrophilic polar group, obtained by reacting a polyester polyol comprising an aliphatic dibasic acid and an aliphatic diol not containing a cyclic structure having a branched alkyl side chain, an aliphatic diol containing a branched alkyl side chain having 3 or more carbon atoms as a chain extending agent, and an organic diisocyanate compound; or (C) a polyurethane resin having a hydrophilic polar group, obtained by reacting a polyol compound containing a cyclic structure and a long alkyl chain with an organic diisocyanate.

8. The magnetic recording medium as claimed in claim 7, wherein a lower layer containing a nonmagnetic powder and a binder is provided between the support and the magnetic layer.

9. The magnetic recording medium claimed in claim 8, wherein the lower layer contains a binder having the same meaning as the binder contained in the magnetic layer.

10. The magnetic recording medium as claimed in claim 7, wherein said ferromagnetic powder is a ferromagnetic metal powder having an average long axis length of 0.01 to 0.10 μm and a crystallite size of 80 to 180 Å or a ferromagnetic hexagonal ferrite powder having an average sheet size of 5 to 40 nm.

11. The magnetic recording medium as claimed in claim 7, wherein the thickness of said magnetic layer is from 0.01 to 0.5 μm.

12. The magnetic recording medium as claimed in claim 7, wherein said ferromagnetic metal powder mainly comprises Fe and contains, based on Fe, from 10 to 40 atm % of Co, from 2 to 20 atm % of Al and from 1 to 15 atm % of Y; the coercive force is from 2,000 to 3,000 oersted (Oe) (160 to 240 kA/m) and the saturation magnetization ($\sigma s$) is from 80 to 170 A·m$^2$/kg.

13. The magnetic recording medium as claimed in claim 7, wherein said ferromagnetic hexagonal ferrite powder is a hexagonal barium ferrite having a coercive force of 2,000 to 3,000 Oe (160 to 240 kA/m) and a saturation magnetization ($\sigma s$) is from 40 to 80 A·m$^2$/kg.

14. The magnetic recording medium as claimed in claim 7, wherein said magnetic recording medium is a magnetic disc or tape for recording digital signals, which is applied to an MR reproduction head-mounted recording/reproducing system.

* * * * *